(12) United States Patent
Ait-Haddou et al.

(10) Patent No.: US 7,296,576 B2
(45) Date of Patent: Nov. 20, 2007

(54) POLYMERS FOR ENHANCED SOLUBILITY OF NANOMATERIALS, COMPOSITIONS AND METHODS THEREFOR

(75) Inventors: Hassan Ait-Haddou, Plano, TX (US); Marni Loriel Rutkofsky, Richardson, TX (US)

(73) Assignee: Zyvex Performance Materials, LLC, Columbus, OH (US)

( * ) Notice: Subject to any disclaimer, the term of this patent is extended or adjusted under 35 U.S.C. 154(b) by 0 days.

(21) Appl. No.: 10/920,877

(22) Filed: Aug. 18, 2004

(65) Prior Publication Data
US 2006/0041104 A1 Feb. 23, 2006

(51) Int. Cl.
*C08G 61/00* (2006.01)

(52) U.S. Cl. ............... 128/397; 528/491; 528/501; 528/503; 528/86; 524/501; 524/502; 524/881

(58) Field of Classification Search ......... 528/397, 528/491, 501, 503, 86; 524/502, 881, 501
See application file for complete search history.

(56) References Cited

U.S. PATENT DOCUMENTS

| | | | |
|---|---|---|---|
| 4,663,230 A | 5/1987 | Tennent | |
| 5,098,771 A | 3/1992 | Friend | |
| 5,204,038 A | 4/1993 | Heeger et al. | |
| 5,281,406 A | 1/1994 | Stalling et al. | |
| 5,482,601 A | 1/1996 | Ohshima et al. | |
| 5,560,898 A | 10/1996 | Uchida et al. | |
| 5,578,543 A | 11/1996 | Tennent et al. | |
| 5,611,964 A | 3/1997 | Friend et al. | |
| 5,627,140 A | 5/1997 | Fossheim et al. | |
| 5,753,088 A | 5/1998 | Olk | |
| 5,824,470 A | 10/1998 | Baldeschwieler et al. | |
| 5,866,434 A | 2/1999 | Massey et al. | |
| 5,877,110 A | 3/1999 | Snyder et al. | |
| 5,965,470 A | 10/1999 | Bening et al. | |
| 5,968,650 A | 10/1999 | Tennent et al. | |
| 6,017,390 A | 1/2000 | Charych et al. | |
| 6,066,448 A | 5/2000 | Wohlstadter et al. | |
| 6,113,819 A | 9/2000 | Tennent et al. | |
| 6,140,045 A | 10/2000 | Wohlstadter et al. | |
| 6,146,227 A | 11/2000 | Mancevski | |
| 6,146,230 A | 11/2000 | Kim et al. | |
| 6,180,114 B1 | 1/2001 | Yager et al. | |
| 6,187,823 B1 | 2/2001 | Haddon et al. | |
| 6,203,814 B1 | 3/2001 | Fisher et al. | |
| 6,276,214 B1 | 8/2001 | Kimura et al. | |
| 6,284,832 B1 | 9/2001 | Foulger et al. | |
| 6,299,812 B1 | 10/2001 | Newman et al. | |
| 6,315,956 B1 | 11/2001 | Foulger | |
| 6,331,262 B1 | 12/2001 | Haddon et al. | |
| 6,362,011 B1 | 3/2002 | Massey et al. | |
| 6,368,569 B1 | 4/2002 | Haddon et al. | |
| 6,417,265 B1 | 7/2002 | Foulger | |
| 6,422,450 B1 | 7/2002 | Zhou et al. | |
| 6,426,134 B1 | 7/2002 | Lavin et al. | |
| 6,430,511 B1 | 8/2002 | Tour et al. | |
| 6,432,320 B1 | 8/2002 | Bonsignore et al. | |
| 6,464,908 B1 | 10/2002 | Friend et al. | |
| 6,491,789 B2 | 12/2002 | Niu | |
| 6,524,466 B1 | 2/2003 | Bonaventura et al. | |
| 6,531,513 B2 | 3/2003 | Haddon et al. | |
| 6,555,945 B1 | 4/2003 | Baughman et al. | |
| 6,569,937 B2 | 5/2003 | Foulger et al. | |
| 6,576,341 B1 | 6/2003 | Davey et al. | |
| 6,597,090 B1 | 7/2003 | Mancevski | |
| 6,599,961 B1 | 7/2003 | Pienkowski et al. | |
| 6,610,351 B2 | 8/2003 | Shchegolikhin et al. | |
| 6,617,398 B2 | 9/2003 | Yeager et al. | |
| 6,630,772 B1 | 10/2003 | Bower et al. | |
| 6,634,321 B2 | 10/2003 | Hussain et al. | |
| 6,641,793 B2 | 11/2003 | Haddon et al. | |
| 6,645,455 B2 | 11/2003 | Margrave et al. | |
| 6,656,763 B1 | 12/2003 | Oglesby et al. | |
| 6,669,918 B2 | 12/2003 | Schleier-Smith et al. | |
| 6,670,179 B1 | 12/2003 | Mattson et al. | |
| 6,680,016 B2 | 1/2004 | Wang et al. | |
| 6,682,677 B2 | 1/2004 | Lobovsky et al. | |
| 6,683,783 B1 | 1/2004 | Smalley et al. | |
| 6,685,810 B2 | 2/2004 | Noca et al. | |
| 6,693,055 B2 | 2/2004 | Yoon et al. | |
| 6,695,974 B2 | 2/2004 | Withers et al. | |
| 6,709,566 B2 | 3/2004 | Cumings et al. | |
| 6,712,864 B2 | 3/2004 | Horiuchi et al. | |
| 6,723,299 B1 | 4/2004 | Chen et al. | |

(Continued)

FOREIGN PATENT DOCUMENTS

DE 31 18 503 A 11/1982

(Continued)

OTHER PUBLICATIONS

Claims of 10/850,721.*

(Continued)

*Primary Examiner*—Duc Truong
(74) *Attorney, Agent, or Firm*—Haynes and Boone, LLP

(57) ABSTRACT

Poly(aryleneethynylene) polymers, poly(ferrocenylarylene-ethynylene) polymers and poly(ferrocenylethynylene) polymers having properties particularly useful for solubilizing nanomaterials and for effecting subsequent re-solubilization of a solid polymer-solubilized nanomaterial, and compositions and methods thereto are provided.

25 Claims, No Drawings

U.S. PATENT DOCUMENTS

| | | |
|---|---|---|
| 6,734,087 B2 | 5/2004 | Hidaka et al. |
| 6,737,939 B2 | 5/2004 | Hoppe et al. |
| 6,741,019 B1 | 5/2004 | Filas et al. |
| 6,746,627 B2 | 6/2004 | Niu et al. |
| 6,746,971 B1 | 6/2004 | Ngo et al. |
| 6,749,712 B2 | 6/2004 | Kuper |
| 6,756,025 B2 | 6/2004 | Colbert et al. |
| 6,756,795 B2 | 6/2004 | Hunt et al. |
| 6,758,891 B2 | 7/2004 | Bergemann et al. |
| 6,762,025 B2 | 7/2004 | Cubicciotti |
| 6,762,237 B2 | 7/2004 | Glatkowski et al. |
| 6,764,540 B2 | 7/2004 | Taguchi |
| 6,770,583 B2 | 8/2004 | Keller |
| 6,770,905 B1 | 8/2004 | Buynoski et al. |
| 6,773,954 B1 | 8/2004 | Subramanian et al. |
| 6,774,333 B2 | 8/2004 | Hannah |
| 6,782,154 B2 | 8/2004 | Zhao et al. |
| 6,783,702 B2 | 8/2004 | Niu et al. |
| 6,783,746 B1 | 8/2004 | Zhang et al. |
| 6,790,425 B1 | 9/2004 | Smalley et al. |
| 6,790,790 B1 | 9/2004 | Lyons et al. |
| 6,798,127 B2 | 9/2004 | Mao et al. |
| 6,803,840 B2 | 10/2004 | Hunt et al. |
| 6,805,642 B2 | 10/2004 | Meyer |
| 6,805,801 B1 | 10/2004 | Humayun et al. |
| 6,806,996 B2 | 10/2004 | Tatsuura et al. |
| 6,818,821 B2 | 11/2004 | Fujieda et al. |
| 6,824,974 B2 | 11/2004 | Pisharody et al. |
| 6,825,060 B1 | 11/2004 | Lyons et al. |
| 6,827,918 B2 | 12/2004 | Margrave et al. |
| 6,835,366 B1 | 12/2004 | Margrave et al. |
| 6,841,139 B2 | 12/2004 | Margrave et al. |
| 6,842,328 B2 | 1/2005 | Schott et al. |
| 6,843,850 B2 | 1/2005 | Avouris et al. |
| 6,852,410 B2 | 2/2005 | Veedu et al. |
| 6,861,481 B2 | 3/2005 | Ding et al. |
| 6,866,891 B2 | 3/2005 | Liebau et al. |
| 6,872,681 B2 | 3/2005 | Niu et al. |
| 6,875,274 B2 | 4/2005 | Wong et al. |
| 6,875,412 B2 | 4/2005 | Margrave et al. |
| 6,878,961 B2 | 4/2005 | Lyons et al. |
| 6,890,654 B2 | 5/2005 | Stupp et al. |
| 6,894,359 B2 | 5/2005 | Bradley et al. |
| 6,896,864 B2 | 5/2005 | Clarke |
| 6,897,009 B2 | 5/2005 | Johnson, Jr. et al. |
| 6,899,945 B2 | 5/2005 | Smalley et al. |
| 6,900,264 B2 | 5/2005 | Kumar et al. |
| 6,902,658 B2 | 6/2005 | Talin et al. |
| 6,902,720 B2 | 6/2005 | McGimpsey |
| 6,905,667 B1 | 6/2005 | Chen et al. |
| 6,908,261 B2 | 6/2005 | Hannay et al. |
| 6,914,372 B1 | 7/2005 | Akiyama et al. |
| 6,921,462 B2 | 7/2005 | Montgomery et al. |
| 6,924,003 B2 | 8/2005 | Zhang |
| 6,934,144 B2 | 8/2005 | Ooma et al. |
| 6,936,322 B2 | 8/2005 | Sakakibara et al. |
| 6,936,653 B2 | 8/2005 | McElrath et al. |
| 6,946,597 B2 | 9/2005 | Sager et al. |
| 6,949,216 B2 | 9/2005 | Brice et al. |
| 6,955,939 B1 | 10/2005 | Lyons et al. |
| 6,958,216 B2 | 10/2005 | Kelley et al. |
| 6,960,425 B2 | 11/2005 | Jung et al. |
| 6,962,092 B2 | 11/2005 | Pasquali et al. |
| 6,969,536 B1 | 11/2005 | Tuck et al. |
| 6,969,690 B2 | 11/2005 | Zhou et al. |
| 6,972,467 B2 | 12/2005 | Zhang et al. |
| 6,974,927 B2 | 12/2005 | Hannah |
| 6,979,248 B2 | 12/2005 | Hu et al. |
| 6,979,709 B2 | 12/2005 | Smalley et al. |
| 6,982,174 B2 | 1/2006 | Bonnell et al. |
| 6,989,325 B2 | 1/2006 | Uang et al. |
| 6,991,528 B2 | 1/2006 | Hu et al. |
| 7,008,563 B2 | 3/2006 | Smalley et al. |
| 7,008,758 B2 | 3/2006 | Park et al. |
| 7,015,393 B2 | 3/2006 | Weiner et al. |
| 7,018,261 B2 | 3/2006 | Perlo et al. |
| 7,025,840 B1 | 4/2006 | Adams |
| 7,026,432 B2 | 4/2006 | Charati et al. |
| 7,029,598 B2 | 4/2006 | Sato |
| 7,029,646 B2 | 4/2006 | Margrave et al. |
| 7,040,948 B2 | 5/2006 | Mao et al. |
| 7,045,087 B2 | 5/2006 | Kotov |
| 7,048,903 B2 | 5/2006 | Colbert et al. |
| 7,048,999 B2 | 5/2006 | Smalley et al. |
| 7,052,668 B2 | 5/2006 | Smalley et al. |
| 7,056,452 B2 | 6/2006 | Niu et al. |
| 7,056,455 B2 | 6/2006 | Matyjaszewski et al. |
| 7,060,241 B2 | 6/2006 | Glatkowski |
| 7,061,749 B2 | 6/2006 | Liu et al. |
| 7,065,857 B2 | 6/2006 | Watanabe et al. |
| 7,066,800 B2 | 6/2006 | Chen et al. |
| 7,067,096 B2 | 6/2006 | Iijima et al. |
| 7,070,753 B2 | 7/2006 | Niu et al. |
| 7,070,810 B2 | 7/2006 | Hirsch et al. |
| 7,070,923 B1 | 7/2006 | Loftus |
| 7,071,287 B2 | 7/2006 | Rhine et al. |
| 7,074,980 B2 | 7/2006 | Prato et al. |
| 7,075,067 B2 | 7/2006 | Joyce et al. |
| 7,081,429 B2 | 7/2006 | Kishi et al. |
| 7,087,290 B2 | 8/2006 | Feist et al. |
| 7,093,664 B2 | 8/2006 | Todd et al. |
| 7,094,367 B1 | 8/2006 | Harmon et al. |
| 7,094,467 B2 | 8/2006 | Zhang et al. |
| 7,105,596 B2 | 9/2006 | Smalley et al. |
| 7,112,816 B2 | 9/2006 | Schlaf et al. |
| 7,115,305 B2 | 10/2006 | Bronikowski et al. |
| 7,116,273 B2 | 10/2006 | Morikawa et al. |
| 7,118,881 B2 | 10/2006 | Lee et al. |
| 7,122,165 B2 | 10/2006 | Wong et al. |
| 7,122,461 B2 | 10/2006 | Dubin |
| 7,125,533 B2 | 10/2006 | Khabashesku et al. |
| 7,126,207 B2 | 10/2006 | Mosley et al. |
| 7,148,269 B2 | 12/2006 | Winey et al. |
| 7,151,625 B2 | 12/2006 | Nagamura et al. |
| 7,153,903 B1 | 12/2006 | Barraza et al. |
| 7,160,531 B1 | 1/2007 | Jacques et al. |
| 2001/0004471 A1 | 6/2001 | Zhang |
| 2001/0010809 A1 | 8/2001 | Haddon et al. |
| 2001/0016283 A1 | 8/2001 | Shiraishi et al. |
| 2001/0016608 A1 | 8/2001 | Haddon et al. |
| 2001/0031900 A1 | 10/2001 | Margrave et al. |
| 2001/0041160 A1 | 11/2001 | Margrave et al. |
| 2002/0004028 A1 | 1/2002 | Margrave et al. |
| 2002/0004556 A1 | 1/2002 | Foulger et al. |
| 2002/0008956 A1 | 1/2002 | Niu |
| 2002/0025490 A1 | 2/2002 | Shchegolikhin et al. |
| 2002/0028337 A1 | 3/2002 | Yeager et al. |
| 2002/0034757 A1 | 3/2002 | Cubicciotti |
| 2002/0046872 A1 | 4/2002 | Smalley et al. |
| 2002/0048632 A1 | 4/2002 | Smalley et al. |
| 2002/0049495 A1 | 4/2002 | Kutryk et al. |
| 2002/0053257 A1 | 5/2002 | Brice et al. |
| 2002/0053522 A1 | 5/2002 | Cumings et al. |
| 2002/0068170 A1 | 6/2002 | Smalley et al. |
| 2002/0081397 A1 | 6/2002 | McGill et al. |
| 2002/0081460 A1 | 6/2002 | Feist et al. |
| 2002/0085968 A1 | 7/2002 | Smalley et al. |
| 2002/0086124 A1 | 7/2002 | Margrave et al. |
| 2002/0090330 A1 | 7/2002 | Smalley et al. |
| 2002/0090331 A1 | 7/2002 | Smalley et al. |
| 2002/0092613 A1 | 7/2002 | Kuper |
| 2002/0094311 A1 | 7/2002 | Smalley et al. |
| 2002/0098135 A1 | 7/2002 | Smalley et al. |
| 2002/0100578 A1 | 8/2002 | Withers et al. |

| | | | | | |
|---|---|---|---|---|---|
| 2002/0102194 A1 | 8/2002 | Smalley et al. | 2003/0186167 A1 | 10/2003 | Johnson, Jr. et al. |
| 2002/0102196 A1 | 8/2002 | Smalley et al. | 2003/0203139 A1 | 10/2003 | Ren et al. |
| 2002/0102617 A1 | 8/2002 | MacBeath et al. | 2003/0205457 A1 | 11/2003 | Choi et al. |
| 2002/0110513 A1 | 8/2002 | Margrave et al. | 2003/0207984 A1 | 11/2003 | Ding et al. |
| 2002/0113335 A1 | 8/2002 | Lobovsky et al. | 2003/0209448 A1 | 11/2003 | Hu et al. |
| 2002/0117659 A1 | 8/2002 | Lieber et al. | 2003/0211028 A1 | 11/2003 | Smalley et al. |
| 2002/0122765 A1 | 9/2002 | Horiuchi et al. | 2003/0211029 A1 | 11/2003 | Someya et al. |
| 2002/0127162 A1 | 9/2002 | Smalley et al. | 2003/0215816 A1 | 11/2003 | Sundararajan et al. |
| 2002/0127169 A1 | 9/2002 | Smalley et al. | 2003/0216502 A1 | 11/2003 | McElrath et al. |
| 2002/0136681 A1 | 9/2002 | Smalley et al. | 2003/0218224 A1 | 11/2003 | Schlaf et al. |
| 2002/0136683 A1 | 9/2002 | Smalley et al. | 2003/0220518 A1 | 11/2003 | Bolskar et al. |
| 2002/0141934 A1 | 10/2002 | Gogotsi et al. | 2003/0227243 A1 | 12/2003 | Perlo et al. |
| 2002/0150524 A1 | 10/2002 | Smalley et al. | 2003/0228467 A1 | 12/2003 | Liebau et al. |
| 2002/0159943 A1 | 10/2002 | Smalley et al. | 2004/0000661 A1 | 1/2004 | Sato |
| 2002/0167374 A1 | 11/2002 | Hunt et al. | 2004/0007528 A1 | 1/2004 | Bakajin et al. |
| 2002/0167375 A1 | 11/2002 | Hoppe et al. | 2004/0009114 A1 | 1/2004 | Margrave et al. |
| 2002/0172639 A1 | 11/2002 | Horiuchi et al. | 2004/0013597 A1 | 1/2004 | Mao et al. |
| 2002/0172963 A1 | 11/2002 | Kelley et al. | 2004/0016912 A1 | 1/2004 | Bandyopadhyay et al. |
| 2002/0176650 A1 | 11/2002 | Zhao et al. | 2004/0018139 A1 | 1/2004 | Mancevski |
| 2002/0180077 A1 | 12/2002 | Glatkowski et al. | 2004/0018371 A1 | 1/2004 | Mao |
| 2002/0180306 A1 | 12/2002 | Hunt et al. | 2004/0018423 A1 | 1/2004 | Bollito et al. |
| 2002/0197474 A1 | 12/2002 | Reynolds | 2004/0018543 A1 | 1/2004 | Balavoine et al. |
| 2003/0001141 A1 | 1/2003 | Sun et al. | 2004/0022677 A1 | 2/2004 | Wohlstadter et al. |
| 2003/0008123 A1 | 1/2003 | Glatkowski et al. | 2004/0022718 A1 | 2/2004 | Stupp et al. |
| 2003/0012723 A1 | 1/2003 | Clarke | 2004/0023610 A1 | 2/2004 | Hu et al. |
| 2003/0017936 A1 | 1/2003 | Yoon et al. | 2004/0028599 A1 | 2/2004 | Pierard et al. |
| 2003/0026754 A1 | 2/2003 | Clarke et al. | 2004/0028859 A1 | 2/2004 | LeGrande et al. |
| 2003/0039604 A1 | 2/2003 | Niu et al. | 2004/0029297 A1 | 2/2004 | Bonnell et al. |
| 2003/0039860 A1 | 2/2003 | Cheon et al. | 2004/0029706 A1 | 2/2004 | Barrera et al. |
| 2003/0044608 A1 | 3/2003 | Yoshizawa et al. | 2004/0034177 A1* | 2/2004 | Chen ..................... 525/416 |
| 2003/0052006 A1 | 3/2003 | Noca et al. | 2004/0035355 A1 | 2/2004 | Avouris et al. |
| 2003/0065206 A1 | 4/2003 | Bolskar et al. | 2004/0036056 A1 | 2/2004 | Shea et al. |
| 2003/0065355 A1 | 4/2003 | Weber et al. | 2004/0036128 A1 | 2/2004 | Zhang et al. |
| 2003/0066956 A1 | 4/2003 | Gruber et al. | 2004/0038007 A1 | 2/2004 | Kotov et al. |
| 2003/0077515 A1 | 4/2003 | Chen et al. | 2004/0038251 A1 | 2/2004 | Smalley et al. |
| 2003/0083421 A1 | 5/2003 | Kumar et al. | 2004/0040834 A1 | 3/2004 | Smalley et al. |
| 2003/0086858 A1 | 5/2003 | Niu et al. | 2004/0041154 A1 | 3/2004 | Watanabe et al. |
| 2003/0089890 A1 | 5/2003 | Niu et al. | 2004/0048241 A1 | 3/2004 | Freeman et al. |
| 2003/0089893 A1 | 5/2003 | Niu et al. | 2004/0051933 A1 | 3/2004 | Tatsuura et al. |
| 2003/0091750 A1 | 5/2003 | Chen | 2004/0058058 A1 | 3/2004 | Shchegolikhin et al. |
| 2003/0093107 A1 | 5/2003 | Parsonage et al. | 2004/0058457 A1 | 3/2004 | Huang et al. |
| 2003/0101901 A1 | 6/2003 | Bergemann et al. | 2004/0069454 A1 | 4/2004 | Bonsignore et al. |
| 2003/0102585 A1 | 6/2003 | Poulin et al. | 2004/0070326 A1 | 4/2004 | Mao et al. |
| 2003/0108477 A1 | 6/2003 | Keller et al. | 2004/0071624 A1 | 4/2004 | Tour et al. |
| 2003/0111333 A1 | 6/2003 | Montgomery et al. | 2004/0071949 A1 | 4/2004 | Glatkowski et al. |
| 2003/0111646 A1 | 6/2003 | Niu et al. | 2004/0076681 A1 | 4/2004 | Dennis et al. |
| 2003/0111946 A1 | 6/2003 | Talin et al. | 2004/0082247 A1 | 4/2004 | Desai et al. |
| 2003/0113714 A1 | 6/2003 | Belcher et al. | 2004/0084353 A1 | 5/2004 | Hannah |
| 2003/0116757 A1 | 6/2003 | Miyoshi et al. | 2004/0092329 A1 | 5/2004 | Meyer |
| 2003/0118815 A1 | 6/2003 | Rodriguez et al. | 2004/0092330 A1 | 5/2004 | Meyer et al. |
| 2003/0122111 A1 | 7/2003 | Glatkowski | 2004/0101634 A1 | 5/2004 | Park et al. |
| 2003/0129471 A1 | 7/2003 | Kitade et al. | 2004/0102577 A1 | 5/2004 | Hsu et al. |
| 2003/0133865 A1 | 7/2003 | Smalley et al. | 2004/0105726 A1 | 6/2004 | Hannay et al. |
| 2003/0134736 A1 | 7/2003 | Keller | 2004/0113127 A1 | 6/2004 | Min et al. |
| 2003/0142456 A1 | 7/2003 | Carnahan | 2004/0115232 A1 | 6/2004 | Giroud et al. |
| 2003/0144185 A1 | 7/2003 | McGimpsey | 2004/0115501 A1 | 6/2004 | Hinokuma et al. |
| 2003/0148086 A1 | 8/2003 | Pfefferle et al. | 2004/0120100 A1 | 6/2004 | Reynolds, III |
| 2003/0151030 A1 | 8/2003 | Gurin | 2004/0120879 A1 | 6/2004 | Chen et al. |
| 2003/0153965 A1 | 8/2003 | Supronowicz et al. | 2004/0121018 A1 | 6/2004 | Grate et al. |
| 2003/0155143 A1 | 8/2003 | Fujieda et al. | 2004/0124504 A1 | 7/2004 | Hsu |
| 2003/0158351 A1 | 8/2003 | Smith et al. | 2004/0127637 A1 | 7/2004 | Hsu et al. |
| 2003/0164477 A1 | 9/2003 | Zhou et al. | 2004/0131835 A1 | 7/2004 | Schmitt et al. |
| 2003/0168756 A1 | 9/2003 | Balkus, Jr. et al. | 2004/0131859 A1 | 7/2004 | Yerushaimi-Rozen et al. |
| 2003/0170166 A1 | 9/2003 | Smalley et al. | 2004/0131934 A1 | 7/2004 | Sugnaux et al. |
| 2003/0170167 A1 | 9/2003 | Nikolaev et al. | 2004/0132072 A1 | 7/2004 | Zheng et al. |
| 2003/0175803 A1 | 9/2003 | Tsionsky et al. | 2004/0132845 A1 | 7/2004 | Rhine et al. |
| 2003/0178607 A1 | 9/2003 | Swager et al. | 2004/0136893 A1 | 7/2004 | Horiuchi et al. |
| 2003/0180491 A1 | 9/2003 | Hirsch et al. | 2004/0136894 A1 | 7/2004 | Yoshizawa et al. |
| 2003/0180526 A1 | 9/2003 | Winey et al. | 2004/0137834 A1 | 7/2004 | Webb et al. |
| 2003/0181328 A1 | 9/2003 | Hwang et al. | 2004/0142172 A1 | 7/2004 | Sugiyama et al. |
| 2003/0183560 A1 | 10/2003 | Hannah | 2004/0142285 A1 | 7/2004 | Jung et al. |
| 2003/0185741 A1 | 10/2003 | Matyjaszewski et al. | 2004/0146452 A1 | 7/2004 | Fujieda et al. |
| 2003/0185985 A1 | 10/2003 | Bronikowski et al. | 2004/0146863 A1 | 7/2004 | Pisharody et al. |

| | | | | | |
|---|---|---|---|---|---|
| 2004/0149759 A1 | 8/2004 | Mosher et al. | 2005/0048697 A1 | 3/2005 | Uang et al. |
| 2004/0160156 A1 | 8/2004 | Ohata et al. | 2005/0053826 A1 | 3/2005 | Wang et al. |
| 2004/0166152 A1 | 8/2004 | Hirsch et al. | 2005/0061451 A1 | 3/2005 | Busnaina et al. |
| 2004/0167014 A1 | 8/2004 | Yan et al. | 2005/0062034 A1 | 3/2005 | Dubin |
| 2004/0169151 A1 | 9/2004 | Yagi et al. | 2005/0064647 A1 | 3/2005 | Manabe et al. |
| 2004/0171779 A1 | 9/2004 | Matyjaszewski et al. | 2005/0065229 A1 | 3/2005 | Bonnet et al. |
| 2004/0177451 A1 | 9/2004 | Poulin et al. | 2005/0069669 A1 | 3/2005 | Sakaibara et al. |
| 2004/0179989 A1 | 9/2004 | Height et al. | 2005/0069701 A1 | 3/2005 | Watanabe et al. |
| 2004/0180201 A1 | 9/2004 | Veedu et al. | 2005/0070654 A1 | 3/2005 | Hsu |
| 2004/0180244 A1 | 9/2004 | Tour et al. | 2005/0074390 A1 | 4/2005 | Tour et al. |
| 2004/0184982 A1 | 9/2004 | Burrington et al. | 2005/0074565 A1 | 4/2005 | Cok |
| 2004/0185342 A1 | 9/2004 | Takeuchi et al. | 2005/0074613 A1 | 4/2005 | Tour et al. |
| 2004/0186220 A1 | 9/2004 | Smalley et al. | 2005/0079386 A1 | 4/2005 | Brown, Jr. et al. |
| 2004/0191698 A1 | 9/2004 | Yagi et al. | 2005/0081625 A1 | 4/2005 | Chen et al. |
| 2004/0194944 A1 | 10/2004 | Hendricks et al. | 2005/0083635 A1 | 4/2005 | Ooma et al. |
| 2004/0197638 A1 | 10/2004 | McElrath et al. | 2005/0087726 A1 | 4/2005 | Anazawa et al. |
| 2004/0202603 A1 | 10/2004 | Fischer et al. | 2005/0089677 A1 | 4/2005 | Marissen et al. |
| 2004/0204915 A1 | 10/2004 | Steinthal et al. | 2005/0089684 A1 | 4/2005 | Barron et al. |
| 2004/0206940 A1 | 10/2004 | Gurin | 2005/0090015 A1 | 4/2005 | Hartmann-Thompson |
| 2004/0206942 A1 | 10/2004 | Hsu | 2005/0090388 A1 | 4/2005 | Kishi et al. |
| 2004/0209782 A1 | 10/2004 | Zhang et al. | 2005/0093425 A1 | 5/2005 | Sugiyama |
| 2004/0211942 A1 | 10/2004 | Clark et al. | 2005/0095191 A1 | 5/2005 | Goel et al. |
| 2004/0217336 A1 | 11/2004 | Niu et al. | 2005/0098204 A1 | 5/2005 | Roscheisen et al. |
| 2004/0217520 A1 | 11/2004 | Hong et al. | 2005/0098205 A1 | 5/2005 | Roscheisen et al. |
| 2004/0219093 A1 | 11/2004 | Kim et al. | 2005/0098437 A1 | 5/2005 | Shiepe |
| 2004/0219221 A1 | 11/2004 | Moore et al. | 2005/0100499 A1 | 5/2005 | Oya et al. |
| 2004/0222080 A1 | 11/2004 | Tour et al. | 2005/0100501 A1 | 5/2005 | Veedu et al. |
| 2004/0222413 A1 | 11/2004 | Hsu et al. | 2005/0100960 A1 | 5/2005 | Dal et al. |
| 2004/0223900 A1 | 11/2004 | Khabashesku | 2005/0103097 A1 | 5/2005 | Faltum et al. |
| 2004/0231975 A1 | 11/2004 | Boyd et al. | 2005/0107182 A1 | 5/2005 | Meyer et al. |
| 2004/0232073 A1 | 11/2004 | Papadimitrakopoulos | 2005/0112052 A1 | 5/2005 | Gu et al. |
| 2004/0232389 A1 | 11/2004 | Elkovitch et al. | 2005/0112451 A1 | 5/2005 | Lee et al. |
| 2004/0240144 A1 | 12/2004 | Schott et al. | 2005/0113669 A1 | 5/2005 | Helfer et al. |
| 2004/0241080 A1 | 12/2004 | Nagy et al. | 2005/0113676 A1 | 5/2005 | Weiner et al. |
| 2004/0241896 A1 | 12/2004 | Zhou et al. | 2005/0113874 A1 | 5/2005 | Connelly et al. |
| 2004/0241900 A1 | 12/2004 | Tsukamoto et al. | 2005/0113876 A1 | 5/2005 | Weiner et al. |
| 2004/0245085 A1 | 12/2004 | Srinivasan et al. | 2005/0116214 A1 | 6/2005 | Mammana et al. |
| 2004/0247808 A1 | 12/2004 | Cooper et al. | 2005/0116336 A1 | 6/2005 | Chopra et al. |
| 2004/0248282 A1 | 12/2004 | Sobha et al. | 2005/0118372 A1 | 6/2005 | Bonnet et al. |
| 2004/0251042 A1 | 12/2004 | Weiner et al. | 2005/0118403 A1 | 6/2005 | Anazawa et al. |
| 2004/0254297 A1 | 12/2004 | Hsu et al. | 2005/0121068 A1 | 6/2005 | Sager et al. |
| 2004/0257307 A1 | 12/2004 | Bae et al. | 2005/0124020 A1 | 6/2005 | Lee et al. |
| 2004/0258603 A1 | 12/2004 | Yakobson et al. | 2005/0124535 A1 | 6/2005 | McGimpsey |
| 2004/0262636 A1 | 12/2004 | Yang et al. | 2005/0127030 A1 | 6/2005 | Watanabe et al. |
| 2004/0265209 A1 | 12/2004 | Colbert et al. | 2005/0129575 A1 | 6/2005 | Gabriel et al. |
| 2004/0265755 A1 | 12/2004 | Park et al. | 2005/0129858 A1 | 6/2005 | Jin et al. |
| 2004/0266939 A1 | 12/2004 | Chen et al. | 2005/0130258 A1 | 6/2005 | Trent et al. |
| 2005/0001100 A1 | 1/2005 | His-Wu et al. | 2005/0130296 A1 | 6/2005 | Pisharody et al. |
| 2005/0001528 A1 | 1/2005 | Mao et al. | 2005/0131163 A1 | 6/2005 | Rhine et al. |
| 2005/0002849 A1 | 1/2005 | Mitsui et al. | 2005/0133363 A1 | 6/2005 | Hu et al. |
| 2005/0002851 A1 | 1/2005 | McElrath et al. | 2005/0133372 A1 | 6/2005 | Zhou et al. |
| 2005/0006623 A1 | 1/2005 | Wong et al. | 2005/0143508 A1 | 6/2005 | Tyagi et al. |
| 2005/0006843 A1 | 1/2005 | Lan et al. | 2005/0147373 A1 | 7/2005 | Zhang |
| 2005/0007680 A1 | 1/2005 | Naganuma et al. | 2005/0147553 A1 | 7/2005 | Wong et al. |
| 2005/0008919 A1 | 1/2005 | Extrand et al. | 2005/0148984 A1 | 7/2005 | Lindsay et al. |
| 2005/0019791 A1 | 1/2005 | Jung et al. | 2005/0154116 A1 | 7/2005 | Nagy et al. |
| 2005/0022726 A1 | 2/2005 | Wong et al. | 2005/0155216 A1 | 7/2005 | Cho et al. |
| 2005/0025694 A1 | 2/2005 | Zhang et al. | 2005/0158390 A1 | 7/2005 | Rana et al. |
| 2005/0026163 A1 | 2/2005 | Sundararajan et al. | 2005/0158612 A1 | 7/2005 | LeCostaouec et al. |
| 2005/0029498 A1 | 2/2005 | Elkovitch et al. | 2005/0159524 A1 | 7/2005 | Rajagopalan et al. |
| 2005/0031525 A1 | 2/2005 | Iijima et al. | 2005/0160798 A1 | 7/2005 | Pasquail et al. |
| 2005/0031526 A1 | 2/2005 | Clarke | 2005/0161212 A1 | 7/2005 | Leimer et al. |
| 2005/0035334 A1 | 2/2005 | Korzheno et al. | 2005/0162606 A1 | 7/2005 | Doane et al. |
| 2005/0038171 A1 | 2/2005 | Elkovitch et al. | 2005/0165155 A1 | 7/2005 | Blanchet-Fincher |
| 2005/0038203 A1 | 2/2005 | Elkovitch et al. | 2005/0169798 A1 | 8/2005 | Bradley et al. |
| 2005/0038225 A1 | 2/2005 | Charati et al. | 2005/0169830 A1 | 8/2005 | Smalley et al. |
| 2005/0040370 A1 | 2/2005 | Gurin | 2005/0169831 A1 | 8/2005 | Montgomery et al. |
| 2005/0040371 A1 | 2/2005 | Watanabe et al. | 2005/0170121 A1 | 8/2005 | Bonnet et al. |
| 2005/0042450 A1 | 2/2005 | Sano et al. | 2005/0170169 A1 | 8/2005 | Watanabe et al. |
| 2005/0043503 A1 | 2/2005 | Stoddart et al. | 2005/0179594 A1 | 8/2005 | Morikawa et al. |
| 2005/0045030 A1 | 3/2005 | Tonkovich et al. | 2005/0181209 A1 | 8/2005 | Karandikar |
| 2005/0045477 A1 | 3/2005 | Wel et al. | 2005/0184294 A1 | 8/2005 | Zhang |
| 2005/0045877 A1 | 3/2005 | Lyons et al. | 2005/0186333 A1 | 8/2005 | Douglas |

| | | | | | |
|---|---|---|---|---|---|
| 2005/0186378 A1 | 8/2005 | Bhatt | 2006/0027499 A1 | 2/2006 | Ajayan et al. |
| 2005/0186565 A1 | 8/2005 | Malak | 2006/0029537 A1 | 2/2006 | Zhang et al. |
| 2005/0191490 A1 | 9/2005 | Ton-That et al. | 2006/0032702 A1 | 2/2006 | Linsmeier et al. |
| 2005/0194036 A1 | 9/2005 | Basol | 2006/0033226 A1 | 2/2006 | Wang |
| 2005/0194038 A1 | 9/2005 | Brabec | 2006/0036018 A1 | 2/2006 | Winey et al. |
| 2005/0195354 A1 | 9/2005 | Doane et al. | 2006/0036045 A1 | 2/2006 | Wilson et al. |
| 2005/0203203 A1 | 9/2005 | Bonnet et al. | 2006/0039848 A1 | 2/2006 | Matarredona et al. |
| 2005/0205265 A1 | 9/2005 | Todd et al. | 2006/0040381 A1 | 2/2006 | Zhao et al. |
| 2005/0205860 A1 | 9/2005 | Hsu et al. | 2006/0041050 A1 | 2/2006 | Manane et al. |
| 2005/0207963 A1 | 9/2005 | Tour et al. | 2006/0045838 A1 | 3/2006 | Malenfant et al. |
| 2005/0208328 A1 | 9/2005 | Hsu et al. | 2006/0047052 A1 | 3/2006 | Barrera et al. |
| 2005/0209388 A1 | 9/2005 | Hsu et al. | 2006/0051579 A1 | 3/2006 | Chokai et al. |
| 2005/0211294 A1 | 9/2005 | Chittibabu et al. | 2006/0052509 A1 | 3/2006 | Saitoh et al. |
| 2005/0212395 A1 | 9/2005 | Anazawa et al. | 2006/0054488 A1 | 3/2006 | Harmon et al. |
| 2005/0214196 A1 | 9/2005 | Ohashi et al. | 2006/0054555 A1 | 3/2006 | Sun |
| 2005/0214197 A1 | 9/2005 | Gu et al. | 2006/0057016 A1 | 3/2006 | Kumar et al. |
| 2005/0214198 A1 | 9/2005 | Park et al. | 2006/0057053 A1 | 3/2006 | Otobe et al. |
| 2005/0214535 A1 | 9/2005 | Denes et al. | 2006/0057055 A1 | 3/2006 | Resasco et al. |
| 2005/0215718 A1 | 9/2005 | Rajagopalan et al. | 2006/0057290 A1 | 3/2006 | Glatkowski et al. |
| 2005/0218045 A1 | 10/2005 | Hannah | 2006/0057361 A1 | 3/2006 | Ounaies et al. |
| 2005/0221038 A1 | 10/2005 | Park | 2006/0058443 A1 | 3/2006 | Ohashi et al. |
| 2005/0221473 A1 | 10/2005 | Dubin et al. | 2006/0062714 A1 | 3/2006 | Tang et al. |
| 2005/0222333 A1 | 10/2005 | Hsu | 2006/0062718 A1 | 3/2006 | Bahr et al. |
| 2005/0224765 A1 | 10/2005 | Hsu et al. | 2006/0062924 A1 | 3/2006 | Horiuchi et al. |
| 2005/0224788 A1 | 10/2005 | Hsu et al. | 2006/0062930 A1 | 3/2006 | Kumar et al. |
| 2005/0226778 A1 | 10/2005 | Houser et al. | 2006/0062985 A1 | 3/2006 | Karandikar |
| 2005/0228110 A1 | 10/2005 | Ko et al. | 2006/0065546 A1 | 3/2006 | Curodeau |
| 2005/0228140 A1 | 10/2005 | Rajagopalan et al. | 2006/0065887 A1 | 3/2006 | Tiano et al. |
| 2005/0229334 A1 | 10/2005 | Huang et al. | 2006/0067939 A1 | 3/2006 | Buzatu et al. |
| 2005/0229335 A1 | 10/2005 | Huang et al. | 2006/0067941 A1 | 3/2006 | Buzatu et al. |
| 2005/0230270 A1 | 10/2005 | Ren et al. | 2006/0069199 A1 | 3/2006 | Charati et al. |
| 2005/0233158 A1 | 10/2005 | Tour et al. | 2006/0073089 A1 | 4/2006 | Ajayan et al. |
| 2005/0234263 A1 | 10/2005 | Prato et al. | 2006/0081775 A1 | 4/2006 | Joyce et al. |
| 2005/0238810 A1 | 10/2005 | Scarlnge et al. | 2006/0081882 A1 | 4/2006 | Malenfant et al. |
| 2005/0239948 A1 | 10/2005 | Haik et al. | 2006/0084742 A1 | 4/2006 | Ishida et al. |
| 2005/0242089 A1 | 11/2005 | Benitsch et al. | 2006/0084752 A1 | 4/2006 | Ounaies et al. |
| 2005/0242344 A1 | 11/2005 | Lee et al. | 2006/0094309 A1 | 5/2006 | Holtkamp et al. |
| 2005/0244326 A1 | 11/2005 | Colbert et al. | 2006/0098389 A1 | 5/2006 | Liu et al. |
| 2005/0244991 A1 | 11/2005 | Mao et al. | 2006/0099135 A1 | 5/2006 | Yodh et al. |
| 2005/0245667 A1 | 11/2005 | Harmon et al. | 2006/0099715 A1 | 5/2006 | Munoz et al. |
| 2005/0245690 A1 | 11/2005 | Rajagopalan et al. | 2006/0103641 A1 | 5/2006 | Marhefka et al. |
| 2005/0247237 A1 | 11/2005 | Schukat et al. | 2006/0104886 A1 | 5/2006 | Wilson |
| 2005/0250244 A1 | 11/2005 | Li et al. | 2006/0104890 A1 | 5/2006 | Harutyunyan et al. |
| 2005/0254760 A1 | 11/2005 | Sakakibara et al. | 2006/0110537 A1 | 5/2006 | Huang et al. |
| 2005/0255030 A1 | 11/2005 | Tour et al. | 2006/0115640 A1 | 6/2006 | Yodh et al. |
| 2005/0255312 A1 | 11/2005 | Fujihara et al. | 2006/0115711 A1 | 6/2006 | Kim et al. |
| 2005/0257946 A1 | 11/2005 | Kirby et al. | 2006/0116284 A1 | 6/2006 | Pak et al. |
| 2005/0261670 A1 | 11/2005 | Weber et al. | 2006/0121275 A1 | 6/2006 | Poulin et al. |
| 2005/0262674 A1 | 12/2005 | Reynolds, III | 2006/0122284 A1 | 6/2006 | Rodriguez-Macias et al. |
| 2005/0263456 A1 | 12/2005 | Cooper et al. | 2006/0122614 A1 | 6/2006 | Truckai et al. |
| 2005/0266605 A1 | 12/2005 | Kawakami | 2006/0124028 A1 | 6/2006 | Huang et al. |
| 2005/0271648 A1 | 12/2005 | Sugiyama | 2006/0124613 A1 | 6/2006 | Kumar et al. |
| 2005/0271829 A1 | 12/2005 | Kumar et al. | 2006/0126175 A1 | 6/2006 | Lu et al. |
| 2005/0272143 A1 | 12/2005 | Bureau et al. | 2006/0127470 A1 | 6/2006 | Hirsch et al. |
| 2005/0272856 A1 | 12/2005 | Cooper et al. | 2006/0131440 A1 | 6/2006 | Yen |
| 2005/0276743 A1 | 12/2005 | Lacombe et al. | 2006/0131570 A1 | 6/2006 | Meng |
| 2005/0277160 A1 | 12/2005 | Shiba et al. | 2006/0135030 A1 | 6/2006 | Mao |
| 2005/0277201 A1 | 12/2005 | Sivarajan et al. | 2006/0135281 A1 | 6/2006 | Palumbo et al. |
| 2005/0277675 A1 | 12/2005 | Fuugetsu et al. | 2006/0135282 A1 | 6/2006 | Palumbo et al. |
| 2005/0279478 A1 | 12/2005 | Draper et al. | 2006/0135677 A1 | 6/2006 | Huang et al. |
| 2005/0284337 A1 | 12/2005 | Shigematsu et al. | 2006/0137817 A1 | 6/2006 | Ma et al. |
| 2005/0287371 A1 | 12/2005 | Chaudhari et al. | 2006/0140847 A1 | 6/2006 | Yang et al. |
| 2005/0287414 A1 | 12/2005 | Noh | 2006/0142148 A1 | 6/2006 | Ma et al. |
| 2006/0001013 A1 | 1/2006 | Dupire et al. | 2006/0142149 A1 | 6/2006 | Ma et al. |
| 2006/0003203 A1 | 1/2006 | Wang et al. | 2006/0142466 A1 | 6/2006 | Tour et al. |
| 2006/0003401 A1 | 1/2006 | Lee et al. | 2006/0145194 A1 | 7/2006 | Barron et al. |
| 2006/0014068 A1 | 1/2006 | Boysen et al. | 2006/0148642 A1 | 7/2006 | Ryu et al. |
| 2006/0014155 A1 | 1/2006 | Hamers et al. | 2006/0151844 A1 | 7/2006 | Avouris et al. |
| 2006/0014375 A1 | 1/2006 | Ford et al. | 2006/0154195 A1 | 7/2006 | Mather et al. |
| 2006/0016552 A1 | 1/2006 | Barbone et al. | 2006/0154489 A1 | 7/2006 | Tornow et al. |
| 2006/0019093 A1 | 1/2006 | Zhang et al. | 2006/0159612 A1 | 7/2006 | Ziegler et al. |
| 2006/0024503 A1 | 2/2006 | Wong et al. | 2006/0159921 A1 | 7/2006 | Murthy et al. |
| 2006/0025515 A1 | 2/2006 | Scaringe et al. | 2006/0162818 A1 | 7/2006 | Kumar et al. |

| | | | |
|---|---|---|---|
| 2006/0165586 A1 | 7/2006 | Wong et al. | |
| 2006/0165896 A1 | 7/2006 | Zfzali-Ardakani et al. | |
| 2006/0166003 A1 | 7/2006 | Khabashesku et al. | |
| 2006/0167139 A1 | 7/2006 | Nelson et al. | |
| 2006/0167147 A1 | 7/2006 | Asgari | |
| 2006/0171874 A1 | 8/2006 | Khabashesku et al. | |
| 2006/0172179 A1 | 8/2006 | Gu et al. | |
| 2006/0174789 A1 | 8/2006 | Liebau et al. | |
| 2006/0175581 A1 | 8/2006 | Douglas | |
| 2006/0177946 A1 | 8/2006 | Dubin | |
| 2006/0180755 A1 | 8/2006 | Chang et al. | |
| 2006/0184714 A1 | 8/2006 | Nam et al. | |
| 2006/0188723 A1 | 8/2006 | Rowley et al. | |
| 2006/0188774 A1 | 8/2006 | Niu et al. | |
| 2006/0189412 A1 | 8/2006 | Sullivan et al. | |
| 2006/0192475 A1 | 8/2006 | Lee et al. | |
| 2006/0193026 A1 | 8/2006 | Nagamura et al. | |
| 2006/0193868 A1 | 8/2006 | Fisher et al. | |
| 2006/0194058 A1 | 8/2006 | Amlani et al. | |
| 2006/0199770 A1 | 9/2006 | Bianco et al. | |
| 2006/0201880 A1 | 9/2006 | Ziegler et al. | |
| 2006/0202168 A1 | 9/2006 | Barrera et al. | |
| 2006/0205872 A1 | 9/2006 | Elkovitch | |
| 2006/0207758 A1 | 9/2006 | Jow et al. | |
| 2006/0210466 A1 | 9/2006 | Mitra et al. | |
| 2006/0211236 A1 | 9/2006 | Bureau et al. | |
| 2006/0211807 A1 | 9/2006 | Koning et al. | |
| 2006/0214262 A1 | 9/2006 | Mosley et al. | |
| 2006/0219689 A1 | 10/2006 | Huang et al. | |
| 2006/0223991 A1 | 10/2006 | Zhang et al. | |
| 2006/0228497 A1 | 10/2006 | Kumar et al. | |
| 2006/0231399 A1 | 10/2006 | Smalley et al. | |
| 2006/0233692 A1 | 10/2006 | Scaring et al. | |
| 2006/0235113 A1 | 10/2006 | Dorgan et al. | |
| 2006/0237217 A1 | 10/2006 | Glew | |
| 2006/0237218 A1 | 10/2006 | Glew | |
| 2006/0237219 A1 | 10/2006 | Glew | |
| 2006/0237221 A1 | 10/2006 | Glew | |
| 2006/0237693 A1 | 10/2006 | O'hara | |
| 2006/0237708 A1 | 10/2006 | Choi et al. | |
| 2006/0240305 A1 | 10/2006 | Huang | |
| 2006/0249020 A1 | 11/2006 | Tonkovich et al. | |
| 2006/0249711 A1 | 11/2006 | Niu et al. | |
| 2006/0251568 A1 | 11/2006 | Fahiman | |
| 2006/0252853 A1 | 11/2006 | Ajayan et al. | |
| 2006/0257556 A1 | 11/2006 | Dai et al. | |
| 2006/0257645 A1 | 11/2006 | Asaka et al. | |
| 2006/0270777 A1 | 11/2006 | Wise et al. | |
| 2006/0270790 A1 | 11/2006 | Comeau | |
| 2006/0274049 A1 | 12/2006 | Spath et al. | |
| 2006/0275371 A1 | 12/2006 | Dai et al. | |
| 2006/0275596 A1 | 12/2006 | Payne et al. | |
| 2006/0275956 A1 | 12/2006 | Konesky | |
| 2006/0276056 A1 | 12/2006 | Ward et al. | |
| 2006/0278444 A1 | 12/2006 | Binstead | |
| 2006/0286023 A1 | 12/2006 | Huang | |
| 2006/0286297 A1 | 12/2006 | Bronikowski et al. | |
| 2006/0291142 A1 | 12/2006 | Grigorian et al. | |
| 2006/0292297 A1 | 12/2006 | Mao et al. | |
| 2006/0293434 A1 | 12/2006 | Yodh et al. | |
| 2007/0003471 A1 | 1/2007 | Kawabata et al. | |
| 2007/0004857 A1 | 1/2007 | Barraza et al. | |
| 2007/0009379 A1 | 1/2007 | Bau et al. | |

FOREIGN PATENT DOCUMENTS

| | | |
|---|---|---|
| EP | 1359121 A2 | 11/2003 |
| EP | 1359169 A2 | 11/2003 |
| EP | 1449887 A1 | 8/2004 |
| JP | 2003096313 | 4/2003 |
| JP | 2003-138040 | 5/2003 |
| JP | 2003292801 | 10/2003 |
| JP | 2004002849 | 1/2004 |
| JP | 2004002850 | 1/2004 |
| WO | WO99/57222 A1 | 11/1999 |
| WO | WO 00/44094 A1 | 7/2000 |
| WO | WO2001/030694 | 5/2001 |
| WO | WO 02/16257 A2 | 8/2001 |
| WO | WO2001/057917 | 8/2001 |
| WO | WO 02/076888 | 10/2002 |
| WO | WO 02/076888 A1 | 10/2002 |
| WO | WO 02/88025 A1 | 11/2002 |
| WO | WO 02/95099 A1 | 11/2002 |
| WO | WO2004/060988 | 7/2004 |

OTHER PUBLICATIONS

Moroni, M. et al., "Rigid Rod Conjugated Polymers for Nonlinear Optics 3. Intramolecular H Bond Effects on Poly(phenyleneethynylene) Chains", *Macromolecules*, (1997), pp. 1964-1972, vol. 30, American Chemical Society.

Shultz, D. et al., "A Modified Procedure for Sonogashira Couplings: Synthesis and Characterization of a Bisporphyrin, 1,1-Bis[zinc(II) 5'-ethynyl-10',15',20'-trimesitylporphyrinyl]methylenecyclohexane", *J. Org. Chem.*, (1998), pp. 4034-4038, vol. 63, American Chemistry Society.

Sonogashira, K., et al., "A Convenient Synthesis of Acetylenes: Catalytic Substitutions of Acelylenic Hydrogen With Bromoalkenes, Iodoarenes, and Bromopyridines", *Tetrahedron Letters*, (1975), pp. 4467-4470, No. 50., Pergamon Press, GB.

Zhou, Q., et al., "Fluorescent Chemosensors Based on Energy Migration in Conjugated Polymers: The Molecular Wire Approach to Increased Sensitivity", *J. Am. Chem. Soc.*, (1995), pp. 12593-12602, vol. 117, American Chemical Society.

Chinese Office Action and translation thereof from Republic of China Application No. 03136785.2, dated Dec. 17, 2004.

Chinese Office Action and translation thereof from Republic of China Application No. 03136786.0, dated Jan. 21, 2005.

Translation of Japanese Office Action from Japanese Application JP2003-127114, dated Nov. 30, 2004.

Translation of Japanese Office Action from Japanese Application JP2003-127132, dated Nov. 30, 2004.

Korean Office Action and translation thereof from Korean Application 10-2003-0029184, dated Apr. 30, 2005.

Brabec, C.J., et al.: "Photoactive blends of poly(para-phenylenevinylene) (PPV) with methanofullerenes from a novel precursor: photophysics and device performance" *Journal of Chemical Physics*, vol. 105, Jan. 31, 2001, pp. 1528-1536.

Hirsch A.: "Functionalization of Single-Walled Carbon Nanotubes" *Angewandte Chemie. International Edition*, Verlag Chemie. Weinhelm, DE, vol. 41, No. 11, 2002, pp. 1853-1859.

Ajayan, P.M., "Nanotubes from Carbon", *Chem. Rev*, (1999), pp. 1787-1799, vol. 99, American Chemical Society.

Ajayan, P. et al., "Single-Walled Carbon Nanotube-Polymer Composites: Strength and Weakness", *Adv. Mater.*, (2000), vol. 12, No. 10, pp. 750-753, Wiley-VCH Verlag GmbH.

Andrews, R. et al., "Nanotube Composite Carbon Fibers", *Appl. Phys. Lett*, (1999), pp. 1329-1331, vol. 75, No. 9, American Institute of Physics.

Andrews et al., "Fabrication of Carbon Multiwall Nanotube/Polymer Composites by Shear Mixing", *Macromolecular Materials and Engineering*, (2002), pp. 395-403, vol. 287, No. 6, Wiley-VCH Verlag GmbH.

Bahr, J. et al., "Dissolution of Small Diameter Single-Wall Carbon Nanotubes in Organic Solvents?", *Chem. Commun.* (2001), pp. 193-194, The Royal Society of Chemistry.

Barraza et al., "SWNT-Filled Thermoplastic and Elastomeric Composites Prepared by Miniemulsion Polymerization", *Nano Letters*, (2002), pp. 797-802, vol. 2, No. 8, American Chemical Society.

Baughman, R. et al., "Carbon Nanotube Actuators", *Science*, (1999), pp. 1340-1344, vol. 284, American Association for the Advancement of Science.

Baughman et al., "Carbon Nanotubes—the Route Toward Applications", *Science*, (2002), pp. 787-792, vol. 297, American Association for the Advancement of Science.

Berber et al., "Unusually High Thermal Conductivity of Carbon Nanotubes", *Physical Review Letters*, (2000), pp. 4613-4616, vol. 84, No. 20, The American Physical Society.

Biercuk et al., "Carbon Nanotube Composites for Thermal Management", *Applied Physics Letters*, (2002), pp. 2767-2769, vol. 80, No. 15, American Institute of Physics.

Blanchet et al., "Polyaniline Nanotube Composites: A High-Resolution Printable Conductor", *Applied Physics Letters*, (2003), pp. 1290-1292, vol. 82, No. 8, American Institute of Physics.

Boul, P. et al., "Reversible Sidewall Functionalization of Buckytubes", *Chemical Physics Letters*, (1999), pp. 367-372, vol. 310, Elsevier Science B.V.

Bunz, U., "Poly(aryleneethynylene)s: Syntheses, Properties, Structures, and Applications", *Chem. Rev.*, (2000), pp. 1605-1644, vol. 100, American Chemical Society.

Calvert, P., "A Recipe for Strength," *Nature*, (1999), pp. 210-211, vol. 399, Macmillan Magazines Ltd.

Chen, J. et al., "Solution Properties of Single-Walled Carbon Nanotubes", *Science*, (1998), pp. 95-98, vol. 282, American Association for the Advancement of Science.

Chen, J. et al., "Dissolution of Full-Length Single-Walled Carbon Nanotubes", *J. Phys. Chem. B*, (2001), pp. 2525-2528, vol. 105, American Chemical Society.

Chen, Y., et al., "Mechanochemical Synthesis of Boron Nitride Nanotubes", *Materials Science Forum*, (1999), pp. 173-177; vol. 312-314 and *Journal of Metastable and Nanocrystalline Materials*, (1999), pp. 173-177, vols. 2-6, Trans Tech Publications.

Chen et al., "Noncovalent Engineering of Carbon Nanotube Surfaces by Rigid, Functional Conjugated Polymers", *Journal of American Chemical Society*, (2002), pp. 9034-9035, vol. 124, No. 131, American Chemical Society.

Chen et al., Supporting Information for "Noncovalent Engineering of Carbon Nanotube Surface by Rigid, Functional Conjugated Polymers", (2002), pp. S1-S7.

Chen, R. et al., "Noncovalent Sidewall Functionalization of Single-Walled Carbon Nanotubes for Protein Immobilization", *J. Am. Chem. Soc.*, (2001), pp. 3838-3839, vol. 123, American Chemical Society.

Chen, J. et al., "Noncovalent Engineering of Carbon Nanotube Surfaces", Nanotech 2004 Conference Technical Program Abstract, Summary and Power Point Slides, Mar. 7-11, 2004, Boston, 2004 NSTI Nanotechnology Conference and Trade Show.

Chen, J., Presentation at 227th ACS National Meeting entitled "Noncovalent Engineering of Carbon Nanotube Surfaces", Anaheim, California, Mar. 31, 2004. (subject matter was identical to above entry).

Coleman et al., "Percolation-Dominated Conductivity in a Conjugated-Polymer-Carbon-Nanotube Composites", *Physical Review B*, (1998), pp. R7492-R7495, vol. 58, No. 12, The American Physical Society.

Dalton et al., "Selective Interaction of a Semiconjugated Organic Polymer with Single-Wall Nanotubes", *J. Phys. Chem. B.*, (2000), pp. 10012-10016, vol. 104, No. 43, American Chemical Society.

Dresselhaus, M.S., et al., "Applications of Carbon Nanostructure", *Science of Fullerenes and Carbon Nanotubes*, (1996), pp. 902-905, Academic Press.

Ebbesen, T., "Cones and Tubes: Geometry in the Chemistry of Carbon", *Acc. Chem. Res.*, (1998), pp. 558-566, vol. 31, American Chemical Society.

Erdogan et al., Synthesis and Mesoscopic Order of a Sugar-Coated Poly (p-phenyfeneethynylene)), *Macromolecules* (2002), pp. 7863-7864, American Chemical Society.

Garboczi et al., "Geometrical Percolation Thresholds of Overlapping Ellipsoids", *Physical Review E*, (1995), pp. 819-828, vol. 52, No. 1, The American Physical Society.

Georgakilas, V. et al., "Organic Functionalization of Carbon Nanotubes", *J. Am. Chem. Soc.*, (2002), pp. 760-761, vol. 124, No. 5, , American Chemical Society.

Han, W. et al., "Synthesis of Boron Nitride Nanotubes from Carbon Nanotubes by a Substitution Reaction", *Applied Physics Letters*, (1998), pp. 3085-3087, vol. 73, No. 21, American Institute of Physics.

Harper, C., "Appendix D—Electrical Properties of Resins and Compounds", *Handbook of Plastics, Elastomers, and Composites, 4th Edition*, (2002), pp. 861-863, McGraw-Hill.

Journet, C. et al., "Production of Carbon Nanotubes", *Appl. Phys. A*, (1998), pp. 1-9, vol. 67, Springer-Verlag.

Journet, C. et al., "Large-Scale Production of Single-Walled Carbon Nanotubes by the Electric-Arc Technique", *Nature*, (1997), pp. 756-758, vol. 388, Nature Publishing Group.

Kilbride et al., "Experimental Observation of Scaling Laws for Alternating Current and Direct Current Conductivity in Polymer-Carbon Nanotube Composite Thin Films", *Journal of Applied Physics*, (2002), pp. 4024-4030, vol. 92, No. 7, American Institute of Physics.

Kim et al., "Ion-Specific Aggregation in Conjugated Polymers: Highly Sensitive and Selective Fluorescent Ion Chemosensors", *Angew. Chem. Int. Ed.* (2000), pp. 3868-3872, Wiley-VCH Verlag GmbH.

Krishnan et al., "Young's Modulus of Single-Walled Nanotubes", *Physical Review B*, (1998), pp. 14013-14019, vol. 58, No. 20, The American Physical Society.

Mcquade, D. et al., "Signal Amplification of a 'Turn-on' Sensor: Harvesting the Light Captured by a Conjugated Polymer", *J. Am. Chem. Soc.*, (2000), pp. 12389-12390, vol. 122; and Supplementary Materials, pp. S1-S7, American Chemical Society.

Miller, B., "Tiny Graphite 'Tubes' Create High-Efficiency Conductive Plastics", *Plastics World*, (1996), pp. 73-77, publisher unknown.

Nikolaev, P. et al., "Gas-Phase Catalytic Growth of Single-Walled Carbon Nanotubes from Carbon Monoxide", *Chemical Physics Letters*, (1999), pp. 91-97, vol. 313, Elsevier Science B.V.

O'Connell, M. et al., "Reversible water-solubilization of single-walled carbon nanotubes by polymer wrapping", *Chemical Physics Letters*, (2001), pp. 265-271, vol. 342, Elsevier Science B.V.

Park et al., "Dispersion of Single Wall Carbon Nanotubes by in Situ Polymerization Under Sonication", *Chemical Physical Letters*, (2002), pp. 303-308, vol. 364, Elsevier Sciences B.V.

Pötschke et al., "Rheological Behavior of Multiwalled Carbon Nanotube/Polycarbonate Composites", *Polymer*, (2002), pp. 3247-3255, vol. 43, Elsevier Science Ltd.

Rajagopal et al., "Homogenous Carbon Nanotube/Polymer Composites for Electrical Applications", *Applied Physics Letters*, (2003), pp. 2928-2930, vol. 83, No, 14, American Institute of Physics.

Rinzler, A.G. et al., "Large-Scale Purification of Single Wall Carbon Nanotubes: Process, Product, and Characterization", *Appl. Phys. A*, (1998), pp. 28-37, vol. 67, Springer-Verlag.

Rutkofsky et al., "Using a Carbon Nanotube Additive to Make Electrically Conductive Commerical Polymer Composites", 9709 Zyvex Application Note, (Mar. 19, 2004), Zyvex Corporation.

Rutkofsky et al., "Using a Carbon Nanotube Additive to Make a Thermally and Electrically Conductive Polyurethane", 9711 Zyvex Application Note, (May 5, 2004), Zyvex Corporation.

Schadler, L. et al., "Load transfer in carbon nanotube epoxy composites", *Applied Physics Letters*, (1998), pp. 3842-3844, vol. 73, No. 26.

Star et al., "Preparation and Properties of Polymer-Wrapped Single-Walled Carbon Nanotubes", *Angew. Chem. Int. Ed.*, (2001), pp. 1721-1725, vol. 40, No. 9, Wiley-VCH Verlag GmbH.

Watts et al., "The Complex Permittivity of Multi-Walled Carbon Nanotube—Polystyrene Composite Films in X-Band", *Chemical Physics Letters*, (2003), pp. 609-614, vol. 378, Elsevier B.V.

Yakobson et al. "Fullerene Nanotubes: $C_{1,000,000}$ and Beyond", *American Scientist*, (1997), pp. 324-337, vol. 84, Sigma XI, The Scientific Research Society.

Carbon Nanotube Functionalization faqs On-line Product Display, (2003), Zyvex Corportation (http://www.zyvex.com/products/cnt_faqs_2.html).

Carbon Nanotube Functionalization specifications—Zyvex Dried Film On-line Product Display, (2003), Zyvex Corporation (http://www.zyvex.com/products/zdf_specs.html).

Carbon Nanotube Functionalization features On-line Product Display, Zyvex Dried Film, (2003), Zyvex Corporation. (http://www.zyvex.com/products/zdf_features.html).

Carbon Nanotube Functionalization benifits On-line Product Display, Zyvex Dried Film, (2003), Zyvex Corporation. (http://www.zyvex.com/products/zdf_benefits.html.

International Patent Cooperation Treaty Search Report and Written Opinion from PCT Application PCT/US2004/016226, dated Jan. 14, 2005.

International Patent Cooperation Treaty Search Report and Written Opinion from PCT Application PCT/US2005/012717, dated Sep. 22, 2005.

Koishi et al., "Synthesis and Non-Linear Optical Properties of 1,3-and 1,4-disubstituted type of poly(phenyleneethynylene)s containing electron-donor and acceptor group", Macromol. Chem. Phys. 201, 2000, pp. 525-532.

Korean Office Action and translation thereof from Korean Application 29185/2003, dated Aug. 19, 2005.

Korean Office Action and translation thereof from Korean Application 29184/2003, dated Aug. 19, 2005.

Moroni et al., "Rigid Rod Conjugated Polymers for Non-Linear Optics. 1. Characterization and Linear Optical Properties of Poly(aryleneethynylene) Derivatives", American Chemical Society, 1994, vol. 27, No. 2, pp. 562-571.

Yamamoto et al., "Preparation of Pl-Conjugated Polymers Composed of Hydroquinone, p- Benzoquinone, and p-Diacetoxyphenylene Units. Optical Redox Properties of the Polymers", Macromolecules, American Chemical Society, 1999, 32, 5556-8896.

Ait-Haddou et al., U.S. Appl. No. 11/105,078, filed Apr. 13, 2005.

Chen, U.S. Appl. No. 60/377,856, filed May 2, 2002.

Chen et al., U.S. Appl. No. 60/377,920, filed May 2, 2002.

Chen et al., U.S. Appl. No. 10/318,730, filed Dec. 13, 2002.

Chen et al., U.S. Appl. No. 60/472,820, filed May 22, 2003.

Chen et al., U.S. Appl. No. 10/895,161, filed Jul. 20, 2004.

Chen et al., U.S. Appl. No. 10/894,738, filed Jul. 20, 2004.

Chen et al., U.S. Appl. No. 10/850,721, filed May 21, 2004.

Ausman et al., "Organic Solvent Dispersions of Single-Walled Carbon Nanotubes: Toward Solutions of Pristine Nanotubes", Phys. Chem. B, 2000, 104, 8911-8915.

Bachtold et al., "Logic Circuits with Carbon Nanotube Transistors" Science 2001, 294, 1317-1320.

Bahr et al., "Functionalization of Carbon Nanotubes by Electrochemical Reduction of Aryl Diazonium Salts: A Bucky Paper Electrode", J. Am. Chem. Soc. 2001, 123, 6538-6542.

Banhart, "The Formation of a Connection Between Carbon Nanotubes in an Electron Beam," Nano Lett. 2001, 1, 329-332.

Chen et al, "Cyclodextrin-Mediated Soft Cutting of Single-Walled Carbon Nanotubes" J. Am. Chem. Soc. 2001, 123, 6201-6202.

Chen, J. et al., "Room-Temperature Assembly of Directional Carbon Nanotubes Strings," J. Am. Chem. Soc. 2002, 124, 758-759.

Cheng et al., "Noncovalent Functionalization and Solubilization of Carbon Nanotubes by Using Conjugated Zn-Porphyrin Polymer", Chem. Eur. J. 2006, 12, pp. 50503-5059.

Collins et al., "Engineering Carbon Nanotubes and Nanotube Circuits Using Electrical Breakdown", Science 2001, 292, 706-709.

Collins et al., "Extreme Oxygene Sensitivity of Electronic Properties of Carbon Nanotubes", Science 2000, 287, 1801-1804.

Craighead, "Nanoelectromechanical Systems", Science 2000, 290, 1532-1535.

Derycke et al., "Carbon Nanotube Inter-and Intramolecular Logic Gates", Nano Lett. 2001, 1, 453-456.

Diehl et al., "Self-Assembled, Deterministic Carbon Nanotube Wiring Networks," Angew. Chem. Int. Ed. 2002, 41, 353-356.

Dresselhaus, M.S. et al., *Science of Fullerenes and Carbon Nanotubes*, 1996, San Diego: Academic Press, 870-917.

European Search Report dated Sep. 18, 2003 form EP03252761.

European Search Report dated Sep. 18, 2003 from EP03252762.

Franklin et al., "An Enhanced CVD Approach to Extensive Nanotube Networks with Directionality." Adv. Mater. 2000, 12, 890-894.

Gerdes et al., "Combing a Carbon Nanotube on a Flat Metal-Insulator-Metal Nanojunction", Europhys. Lett., 1999, 48, (3), 292-298.

Haddon et al., "Chemistry of the Fullerenes: The Manifestation of Strain in a Class of Continuous Aromatic Molecules", Science, 1993, 261, 1545.

Haddon, "Electronic Properties of Carbon Toroids," Nature, 1997, 388, 31-32.

Haddon, R. C., "Magnetism of the carbon allotropes", Nature 1995, 378, 249-255.

Hamon et al., "Dissolution of Single-Walled Carbon Nanotubes", Advanced Materials, 1999, vol. 11, Issue 10, 834-840.

Holzinger et al., "Sidewall Functionalization of Carbon Nanotubes," Angew. Chem. Int. Ed. 2001, 40, 4002-4005.

Hornyak et al., "Template Synthesis of Carbon Nanotubes", Nanostructured Materials, Elsevier, New York, New York, US, vol. 12, No. 1-4, pp. 83-88, 1999.

Huang et al., "Directed Assembly of One-Dimensional Nanostructures into Functional Networks", Science 2001, 291, 630-633.

Iijima et al., "Structural Flexibility of Carbon Nanotubes", J. Chem. Phy., 1996, 104, No. 5, 2089-2092.

Kim et al., "Micromolding in Capillaries: Applications in Materials Science", J. Am. Chem. Soc. 1996, 118, 5722-5731.

Kong et al., "Nanotube Molecular Wires as Chemical Sensors", Science 2000, 287, 622-625.

Korean Office Action for 29185/2003 dated Feb. 17, 2006.

Kuroda et al., "Synthesis of a nonionic water soluble semicondcutor polymer", Chem. Commun., 2003, 26-27.

Lakowicz et al., "Radiative Decay Engineering: Biophysical and Biomedical Applications," Analytical Biochemistry, 2001, 298, 1-24.

Li et al., "Highly-Ordered Carbon Nanotube Arrays for Electronics Applications," Applied Physics Letters, American Institute of Physics, New York, US, vol. 75, No. 3, pp. 367-369, Jul. 19, 1999.

Liu et al., "Controlled Deposition of Individual Single-Walled Carbon Nanotubes on Chemically Functionalized Templates", Chem. Phys. Lett, 1999, 303, 125-129.

Liu, J. et al., "Fullerene Pipes", Science, vol. 280, 1998, 1253-1256.

Martel, "Rings of Single-Walled Carbon Nanotubes", Nature, vol. 398, 1999, 299.

Mattson et al., "Molecular Functionalization of Carbon Nanotubes and Use as Substrates for Neuronal Growth", J. Molecular Neuroscience, 2000, 14, 175-182.

Messer et al., "Microchannel Networks for Nanowire Patterning", J. Am. Chem. Soc. 2000, 122, 10232-10233.

Mickelson et al., "Solvation of Fluorinated Single-Wall Carbon Nanotubes in Alchohol Solvents", Phys. Chem. B, 1999, 103, 4318-4322.

Niyogi, S. et al., "Chromatographic Purification of Soluble Single-Walled Carbon Nanotubes (s-SWNTs)," J. Am. Chem. Soc., 2001, 123, 733-734.

Oh et al., "Stability and cap formation mechanism of single-walled carbon nanotubes", Phys. Rev. B, 1998, 58, No. 11, 7407-7411.

Patent Cooperation Treaty Application PCT/US2002/40789 International Patent Cooperation Treaty Search report dated Apr. 14, 2003.

Rappe et al., "UFF, a Full Periodic Table Force Field for Molecular Mechanics and Molecular Dynamics Simulators", J. Am. Chem. Soc. 1992, 114, 100024.

Riggs et al., "Strong Luminescence of Solubilized Carbon Nanotubes", J. Am. Chem. Soc. 2000, 122, 5879-5880.

Roncali, "Synthetic Principles for Bandgap Control in Linear .pi.-Conjuated Systems", Chem. Rev. 1997, 97, pp. 173-205.

Schlittler et al., "Single Crystals of Single-Walled Carbon Nanotubes Formed by Self-Assembly", Science 2001, 292, 1136-1139.

Smith et al., "Formation Mechanism of Fullerene) Peapods and Coaxial Tubes: A Path to Large Scale Synthesis", Chem. Phys. Lett. 2000, 321, 169-174.

Srivastava et al., "Predictions of Enhanced Chemical Reactivity at Regions of Local Conformational Strain on Carbon Nanotubes: Kinky Chemistry", J. Phys. Chem. B., 1999, 103, 4330-4337.

Stephanek, I. et al., "Nano-mechanical cutting and opening of single wall carbon Nanotubes," Chemical Physics Letters 331 (2000), 125-131.

Sun, Y. et al., "Soluble Dendron-Functionalized Carbon Nanotubes: Preparation, Characterization, and Properties," Chem. Mater. 2001, 13, 2864-2869.

Sutton et al., "On the morphology and growth of electrochemically polymerized polypyrrole", Polymer vol. 36, No. 9, pp. 1849-1857, 1995.

Szejtli, J., "Introduction and general overview of Cyclodextrin Chemistry," Chem. Rev. 1998, 98, 1743-1753.

Tang et al., "Preparation, Alignment, and Optical Properties of Soluble Poly (phenylacetylene)-Wrapped Carbon Nanotubes", Macromolecules 1999, 32, 2569-2576.

Tang et al., "Superconductivity in 4 Angstrom Single-Walled Carbon Nanotubes," Science 2001, 2462-2465.

Tasis et al., "Chemistry of Carbon Nanotubes", American Chemical Society, B Chemical Reviews, Published on the Web Feb. 23, 2006, pp. 1-32.

Taylor et al., "Synthesis and Characterization of Poly (p-phenylene)s with Nonlinear Optical Side Chains", Macromolecules 2000, 33, pp. 2355-2358.

Tombler et al., "Reversible Electromechanical Characteristics of Carbon Nanotubes Under Local-Probe Manipulation", Nature 2000, 405, 769-772.

Waldeck, D. H., et al., "Nonradiative damping of molecular electronic excited states by metal surfaces,"Surf. Sci. 1985, 158, 103.

Wong et al., "Convalently-Functionalized Single-Walled Carbon Nanotube Probe Tips for Chemical Force Microscopy", J. Am. Chem. Soc., 1998, 120, 8557-8558.

Wu et al., "Synthesis of Carboxyl-Containing Conducting Oligomer and Non-Covalent Sidewall Functionalization of Single-Walled Carbon Nanotubes", Journal of Materials Chemistry, 2005, 15, pp. 1833-1873.

Yang et al., "Efficient Blue Polymer Light-Emitting Diodes from a Series of Soluble Poly(paraphenylene)s", Journal of Applied Physics -- Jan. 15, 1996 -- vol. 79, Issue 2, pp. 934-939.

Zhang et al., "Electric-Field-Directed Growth of Aligned Single-Walled Carbon Nanotubes", Applied Physics Letters, vol. 79, No. 19, 2001, 3155-3157.

Zhao et al., "Chromatographic Purification and Properties of Soluble Single-Walled Carbon Nanotubes," J. Am. Chem. Soc. 2001, 123, 11673-11677.

* cited by examiner

POLYMERS FOR ENHANCED SOLUBILITY OF NANOMATERIALS, COMPOSITIONS AND METHODS THEREFOR

FIELD OF THE INVENTION

The present patent application relates generally to the technical field of solubilization of nanomaterials, compositions and methods therefor.

BACKGROUND OF THE INVENTION

Pristine nanotubes are generally insoluble in common solvents and polymers. Such nanotubes are also difficult to chemically functionalize without altering the desirable intrinsic properties of nanotubes. Single-walled nanotubes (SWNTs) have been solubilized in organic solvents and water by polymer wrapping (Dalton et al., (*J. Phys. Chem. B* (2000) 104, 10012); Star et al. (*Angew. Chem., Int. Ed.* (2001) 40, 1721), and O'Connell et al. (*Chem. Phys. Lett.* (2001) 342, 265)), and noncovalently functionalized by adhesion of small molecules for protein immobilization (Chen et al., (*J. Am. Chem. Soc.* 123:3838 (2001))). The polymer wrapping approach works poorly for dissolution of small diameter SWNTs possibly due to unfavorable polymer conformations.

A process of noncovalent functionalization and solubilization of carbon nanotubes is described by Chen, J. et al. (*J. Am. Chem. Soc.*, 124, 9034 (2002)) which process results in excellent nanotube dispersion using a nonwrapping approach. SWNTs were solubilized in chloroform with poly(phenyleneethynylene)s (PPE) along with vigorous shaking and/or short bath-sonication as described by Chen et al. (*ibid*) and in U.S. Patent Publication No. U.S. 2004/0034177 published Feb. 19, 2004, and U.S. patent application Ser. No. 10/318,730 filed Dec. 13, 2002; the contents of such patent applications are incorporated by reference herein in their entirety. The rigid backbone of a PPE cannot wrap around the SWNT in contrast to the polymer wrapping approach described above. The major interaction between the polymer backbone and the nanotube surface is described as parallel π-stacking. Thin film visible and near-infrared spectroscopy of PPE-solubilized nanomaterial demonstrated that the electronic structures are basically intact after solubilization. One such PPE-solubilized nanomaterial sample was obtained by filtration and redissolved in chloroform to a concentration of about 0.1 to 0.2 mg/mL (Chen et al. (*ibid*) and in U.S. Patent Publication No. U.S. 2004/0034177 published Feb. 19, 2004, and U.S. patent application Ser. No. 10/318,730 filed Dec. 13, 2002).

Further rigid polymers for solubilizing nanomaterials, compositions, and methods therefore are described herein.

SUMMARY OF THE INVENTION

The present embodiments provide rigid poly(aryleneethynylene) polymers, poly(ferrocenylaryleneethynylene) polymers, and poly(ferrocenylethynylene) polymers having properties particularly useful for solubilizing nanomaterials and for effecting subsequent resolubilization of a solid material obtained from the solubilized nanomaterial, compositions and methods related thereto. The polymer has at least one functional group for solubilizing nanomaterial, a length of about 25 nm to about 110 nm, and a polydispersity of less than about 2.

Embodiments of the present invention provide a method of making rigid poly(aryleneethynylene) polymers, poly (ferrocenylaryleneethynylene) polymers and poly(ferrocenylethynylene) polymers as described above.

In general, a method of making a rigid poly(aryleneethynylene) polymer of the present invention comprises coupling a para-diethynyl-($R_1$–$R_x$)arylene and an ($R_1$–$R_y$)-para-dihaloarylene in the presence of a first polymerization-terminating haloaryl agent under conditions and for a period of time to produce fluorescence; and terminating the coupling by addition of a second polymerization-terminating haloaryl agent, the second haloaryl agent having equal or greater activity for coupling as compared to the ($R_1$–$R_y$)-para-dihaloarylene.

In general, a method of making a rigid poly(ferrocenylaryleneethynylene) polymer of the present invention comprises coupling a 1,1'-diethynyl-($R_1$–$R_8$)ferrocene and an ($R_1$–$R_z$)-para-dihaloarylene, or coupling a 1,1'-dihalo-($R_1$–$R_8$)ferrocene and a para-diethynyl-($R_1$–$R_z$)arylene, in the presence of a first polymerization-terminating haloaryl agent under conditions for a period of time to produce fluorescence; and terminating the coupling by addition of a second polymerization-terminating haloaryl agent, the second haloaryl agent having equal or greater activity for coupling as compared to the ($R_1$–$R_z$)-para-dihaloarylene or the 1,1'-dihalo-($R_1$–$R_8$)ferrocene.

In general, a method of making a rigid poly(ferrocenylethynylene) polymer of the present invention comprises coupling a 1,1'-diethynyl-($R_1$–$R_8$)ferrocene and an ($R_1$–$R_8$)-1,1'-dihaloferrocene in the presence of a first polymerization-terminating haloaryl agent under conditions for a period of time to produce fluorescence; and terminating the coupling by addition of a second polymerization-terminating haloaryl agent, the second haloaryl agent having equal or greater activity for coupling as compared to the ($R_1$–$R_8$)-1,1'-dihaloferrocene.

A further embodiment of the present invention comprises mixing nanomaterial, a rigid poly(aryleneethynylene) polymer, a poly(ferrocenylaryleneethynylene) polymer, a poly (ferrocenylethynylene) polymer, or a combination thereof, and a solubilization solvent to form a solution. Nanomaterial made soluble by a polymer of the present invention results in a noncovalent complex of nanomaterial and solubilizing polymer. Such a complex is termed herein "processed nanomaterial." Processed nanomaterial may be made into a solution using a solubilization solvent (solution of processed nanomaterial), subsequently removed therefrom by removing solvent and made into a solid (solid processed nanomaterial), re-solubilized by mixing solid processed nanomaterial with a re-solubilization solvent (re-solubilized solution of processed nanomaterial) and made insoluble (insoluble processed nanomaterial). Re-solubilized processed nanomaterial is provided herein at concentrations not heretofore achieved. Such re-solubilized material may be dried and heated to produce insoluble material.

A rigid poly(aryleneethynylene) polymer, poly(ferrocenylaryleneethynylene) polymer, poly(ferrocenylethynylene) polymer, a solution of processed nanomaterial, solid processed nanomaterial obtained from solution by removing solvent, re-solubilized solution of processed nanomaterial, or an insoluble processed nanomaterial made by a method described herein is an embodiment of the present invention.

Compositions comprising a rigid poly(aryleneethynylene) polymer, a poly(ferrocenylaryleneethynylene) polymer, or a poly(ferrocenylethynylene) polymer where the polymer comprises at least one functional group for solubilizing nanomaterial, a length of about 25 nm to about 10 nm, and a polydispersity of less than about 2 are embodiments of the present invention. Further compositions of the present invention include a solution of processed nanomaterial, solid processed nanomaterial obtained from solution by removing solvent, re-solubilized solution of processed nanomaterial, or an insoluble processed nanomaterial. The solution comprises nanomaterial, a polymer as set forth above and a solubilization solvent.

An article of manufacture comprising a polymer, a solid, a solution, or an insoluble solid as described herein are further embodiments of the present invention.

DESCRIPTION

Nanomaterials are solubilized by polymers of the present invention in organic or aqueous solvents, or a combination thereof, in particular in organic solvents to a concentration of about 10 mg/mL to 15 mg/mL. Solid material is obtained from such solutions and re-solubilized to concentrations not heretofore achieved, i.e., concentrations greater than 0.2 mg/mL, typically 1.5 mg/mL or 3.0 mg/mL, or greater.

Polymers for Solubilizing Nanomaterial: Polymers for solubilizing nanomaterial are rigid rods having at least one functional group for solubilizing nanomaterial, a length of about 25 nm to about 110 nm, and a polydispersity of less than about 2. Such polymers are poly(aryleneethynylene) polymers, poly(ferrocenylaryleneethynylene) polymers poly(ferrocenylethynylene) polymer, for example, and are rigid, π-conjugated polymers, the backbone of which noncovalently binds to the nanomaterial in a non-wrapping fashion. By virtue of functional groups present on the backbone of the polymer, the polymers solubilize the nanomaterial.

Polymer length ranges between a minimum length to effect solubilization which is about 25 nanometers and a maximum length that avoids hairpin formation which is about 110 nanometers. That is, an effective polymer has a length that is shorter than a length at which it folds back on itself. Polymers of the present embodiments have a length of between about and including any of 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 105 nm, and 110 nm. Polymers of the present embodiments having a length of about 25 nm to about 110 nm have a number of polymer repeating units depending upon the length of the monomer unit. The number of repeating units is between about 45 to 200 when the repeating unit contains one aryleneethynylene unit since one benzene ring together with one triple bond has a length of about 5.4 Å. Forty-five to 200 of such repeating units provides a polymer length of about 24.3 nm to about 108 nm. The number of repeating units of a polymer having monomers that contain two aryleneethynylene units is one-half that of a polymer having one aryleneethynylene, thereby maintaining the desired length of polymer backbone. The number of repeating units for a multiple ring poly(aryleneethynylene), a poly(ferrocenylaryleneethynylene) polymer or a poly(ferrocenylethynylene) polymer can be calculated based upon the length of the monomer. In certain embodiments, the number of repeating units is equal to or within a range of any of the following numbers of units: 45, 50, 55, 60, 65, 70, 75, 80, 85, 90, 95, 100, 110, 120, 130, 140, 150, 160, 170, 180, 190, and 200. The number of repeating units is determined by proton NMR, for example.

Polymers of the present embodiments have a polydispersity of less than about 2. Polydispersity is the weight-average molecular weight of a polymer divided by the number average molecular weight of the polymer. If polymer chains have a uniform chain length, the polydispersity is 1. Typical values for polydispersity vary depending upon the mechanism of polymerization and are affected by reaction conditions, for example, for addition polymerization, polydispersity values may be between 10 and 20 whereas step polymerization may provide polydispersity values of about 2 to 3 and "living polymerization" may provide a polydispersity value of about 1.

Polydispersity of less than about 2 for embodiments of the present invention is achieved by particular reaction conditions that use a polymerization-terminating haloaryl agent at the beginning of the polymerization reaction to favor polymerization from one end of a growing polymer chain rather than from both ends, and also to further add polymerization-terminating haloaryl agent to terminate the polymerization reaction, thereby providing greater uniformity in the length of polymers produced as discussed further below. The polydispersity of polymers of the present invention may be about 1.2 to about 1.8, about 1.3 to about 1.7, about 1.4 to about 1.6, or about 1.5. Polydispersity may be determined by gel permeation chromatography using polystyrene standards.

Polymers of the present embodiments may be poly(aryleneethynylene) polymers having generic structure I.

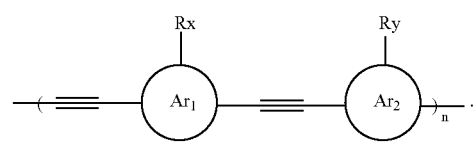

I $Ar_1$ and $Ar_2$ of structure I. are independently phenyl, diphenyl, naphthyl, anthracenyl, phenanthrenyl, pyridinyl, bis-pyridinyl, phenanthrolyl, pyrimidinyl, bis-pyrimidinyl, pyrazinyl, bis-pyrazinyl, aza-anthracenyl, or isomers thereof. $Ar_1$ and $Ar_2$ may be identical or different. The designation "n" is the number of repeating units. The "x" of $R_x$ is the maximum number of substituents on $Ar_1$ and the "y" of $R_y$ is the maximum number of substituents on $Ar_2$. For example, where $Ar_1$ is phenyl, the x is 4; and where $Ar_1$ is pyridinyl, x is 3. The substituents on $Ar_1$ and $Ar_2$ are designated $(R_1-R_x)$ and $(R_1-R_y)$, respectively. The designation "R" refers to an R group of $(R_1-R_x)$ and $(R_1-R_y)$. For example, an R of $(R_1-R_x)$, where x is 4, may refer to $R_1$, $R_2$, $R_3$, or $R_4$. Each R is independently H or a functional group for solubilizing nanomaterial and at least one R of $(R_1-R_x)$ and $(R_1-R_y)$ is a functional group for solubilizing nanomaterial.

An embodiment of the present invention is a polymer having structure I. where $Ar_1$ and $Ar_2$ are phenyl, x and y are 4, and corresponding R groups on $Ar_1$ and $Ar_2$ are identical, resulting in a poly(phenyleneethynylene) polymer provided as structure II.

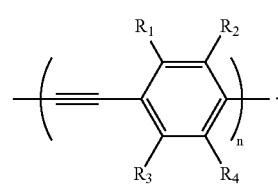

II $R_1$, $R_2$, $R_3$, and $R_4$ of structure II. are independently H or a functional group for solubilizing nanomaterial, and at least one of $R_1$, $R_2$, $R_3$, and $R_4$ is a functional group for solubilizing nanomaterial.

Further polymers of the present embodiments may be poly(ferrocenylaryleneethynylene) polymers having generic structure III.

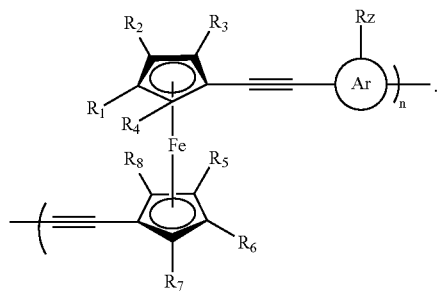

III

Ar of structure III. is phenyl, diphenyl, naphthyl, anthracenyl, phenanthrenyl, pyridinyl, bis-pyridinyl, phenanthrolyl, pyrimidinyl, bis-pyrimidinyl, pyrazinyl, bis-pyrazinyl, azaanthracenyl, or isomers thereof. The designation "n" is the number of repeating units. The "z" of $R_z$ is the maximum number of substituents on Ar. For example, where Ar is phenyl, z is 4; and where Ar is pyridinyl, z is 3. The substituents on Ar are designated ($R_1$–$R_z$). The designation "R" refers to an R group of ($R_1$–$R_z$) or an R group of ($R_1$–$R_8$) of the ferrocenyl. Each R is independently H or a functional group for solubilizing nanomaterial and at least one R of ($R_1$–$R_z$) and ($R_1$–$R_8$) is a functional group for solubilizing nanomaterial.

A poly(ferrocenylethynylene) polymer having a structure 1) as shown below is an embodiment of the present invention. The designation "n" is the number of repeating units. Each R of ($R_1$–$R_8$) is independently H or a functional group for solubilizing nanomaterial and at least one R of ($R_1$–$R_8$) is a functional group for solubilizing nanomaterial.

Exemplary monomer units for polymers of the present invention include monomer units such as monomer units a) to z) and aa) to pp) as follows:

a)

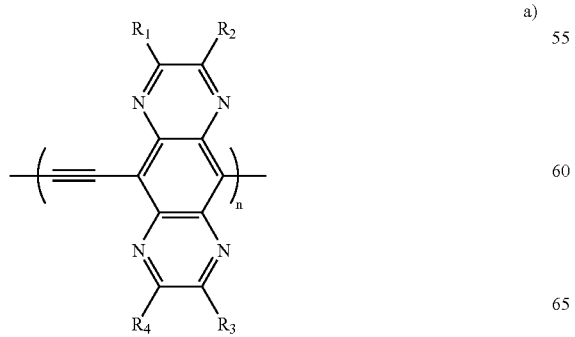

b)

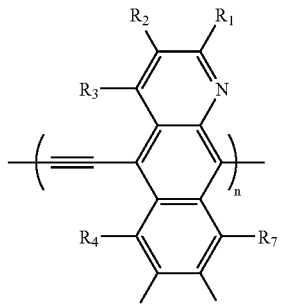

c)

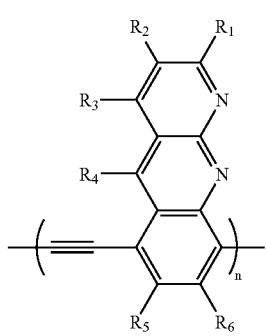

d)

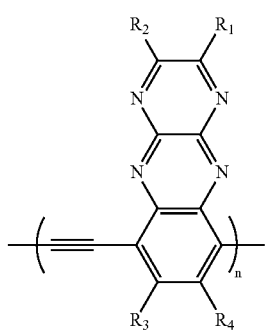

e)

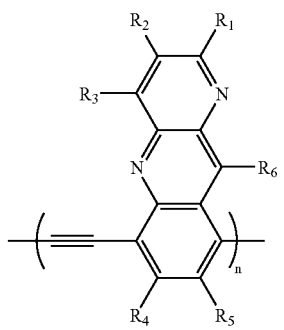

f)

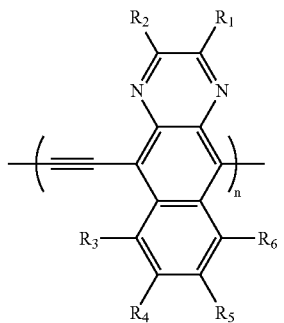

-continued
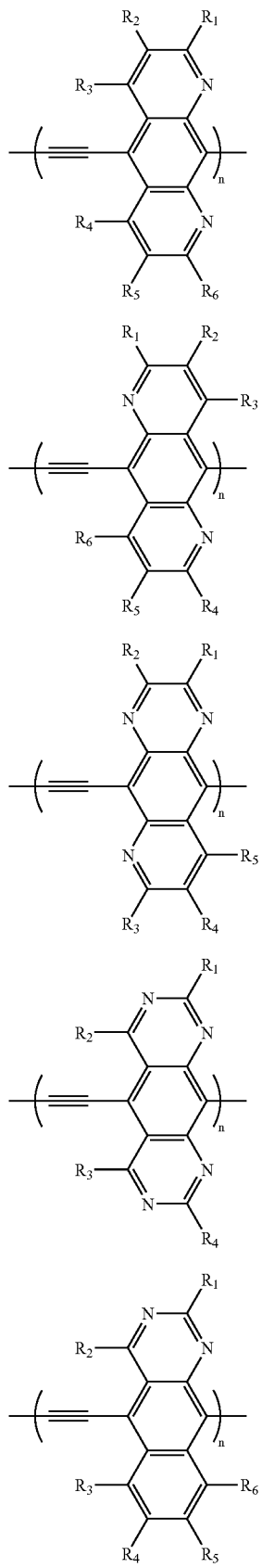
g)
h)
i)
j)
k)
-continued
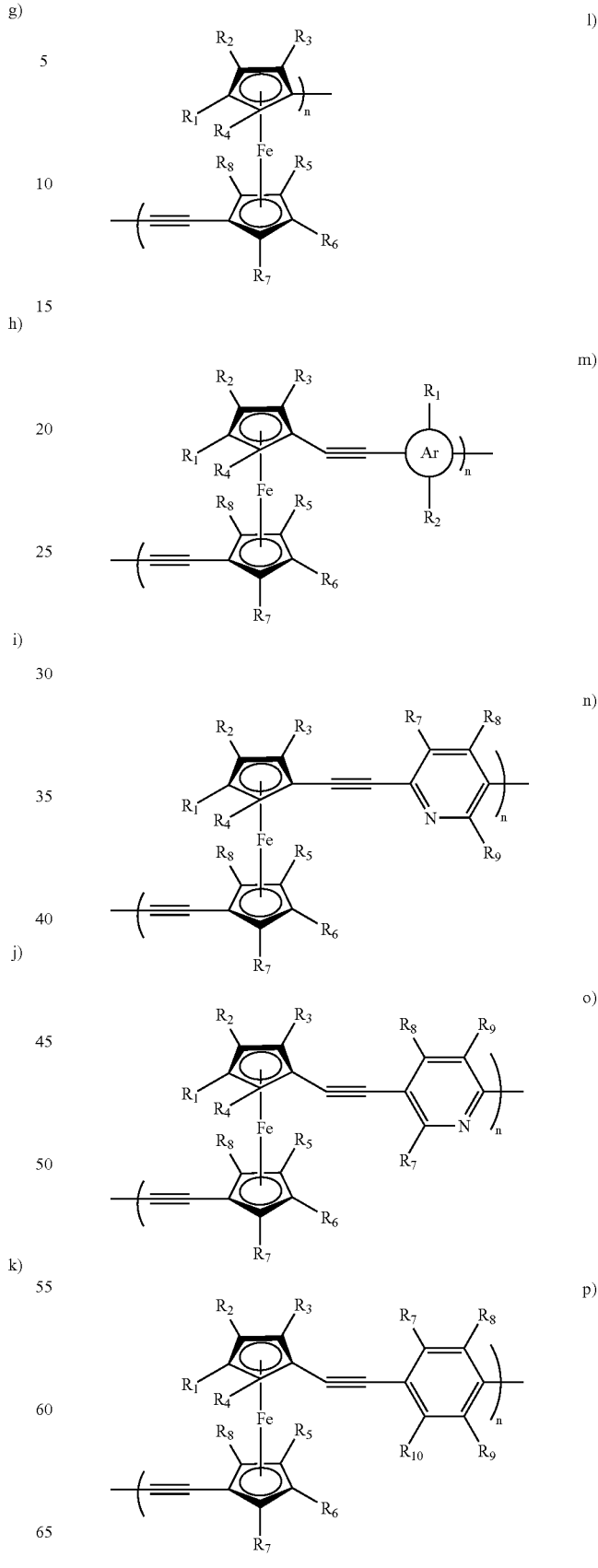
l)
m)
n)
o)
p)

-continued
q)
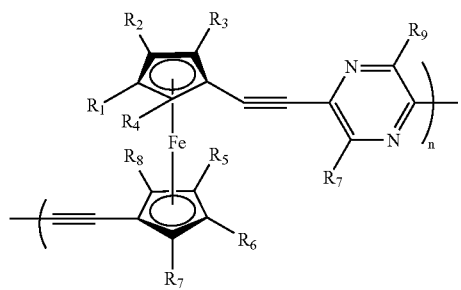
r)
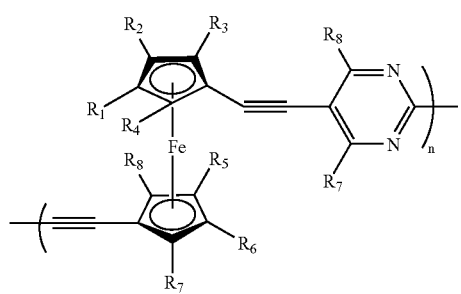
s)
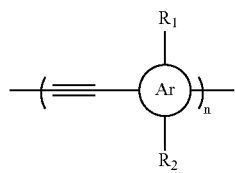
t)
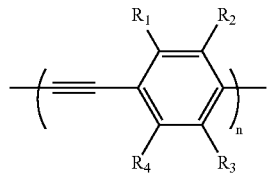
u)
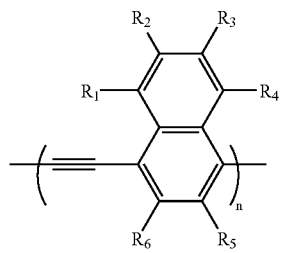
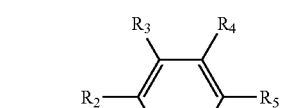
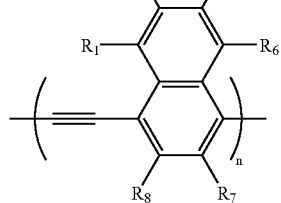
-continued
w)
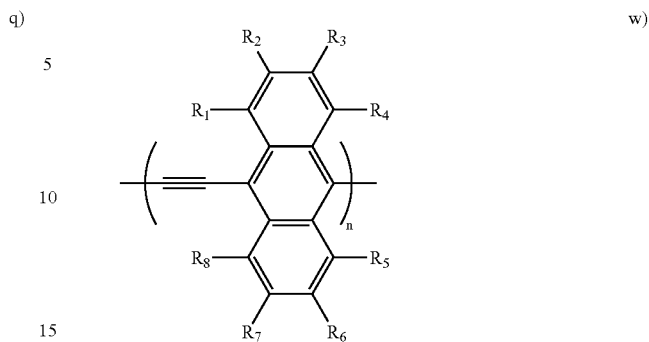
x)
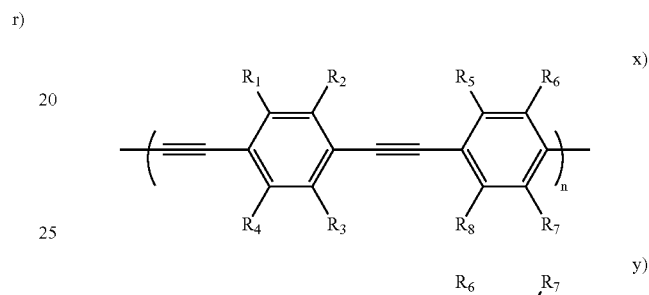
y)
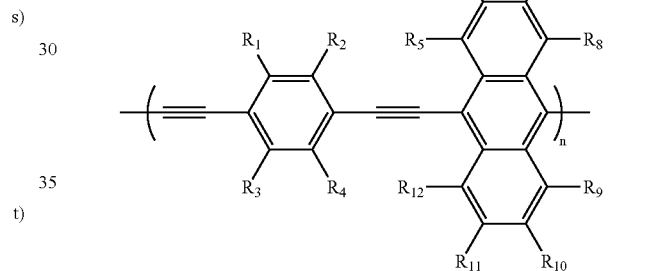
z)
aa)
bb)
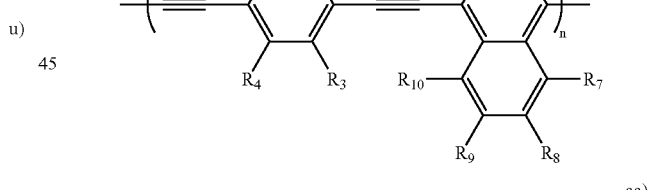

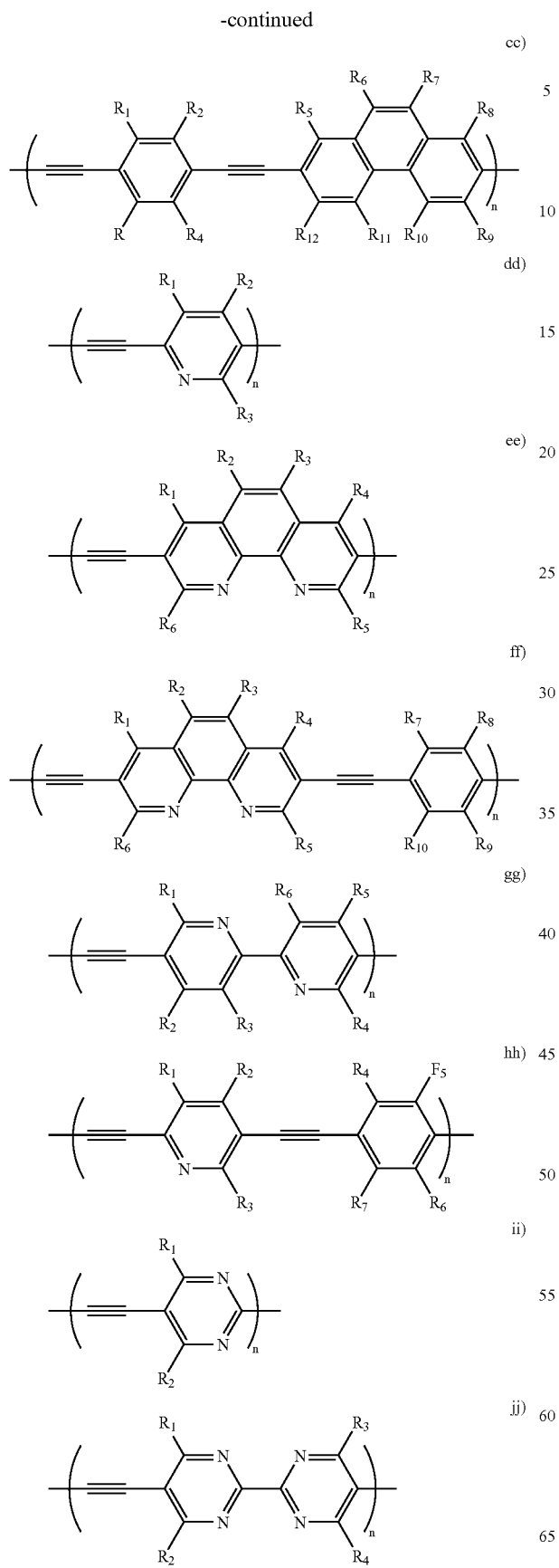
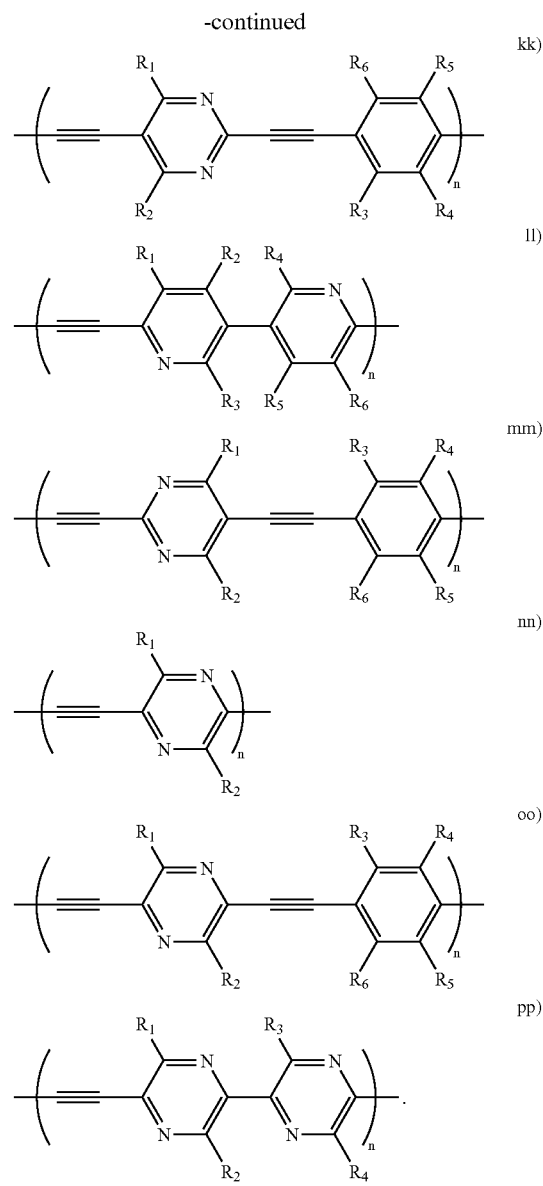

Polymer backbone monomers a)-k), s) to z), and aa) to pp) are examples of poly(aryleneethynylene) backbone monomers; monomers m)-r) are examples of poly(ferrocenylaryleneethynylene) backbone monomers; and monomer l) is an example of a poly(ferrocenylethynylene) backbone polymer. The number of repeating units "n" is such that the length of the polymer is equal to or between about 25 nm and 110 nm.

"Having at least one functional group for solubilizing nanomaterial," as used herein, means that at least one R of the repeat unit of the polymer is a substituent capable of interacting with another chemical group to form a covalent or noncovalent bond. The substituent may be a functional organic group or an inorganic group.

In certain embodiments, the at least one functional group for solubilizing nanomaterial comprises, for example, acetal, acid halide, acyl azide, aldehyde, alkane, alkyl, anhydride, cyclic alkane, arene, alkene, alkyne, alkyl halide, aryl, aryl halide, amine, amide, amino acid, alcohol, alkoxy, azide, aziridine, azo compounds, calixarene, carbohydrate, carbonate, carboxylic acid, carboxylate, carbodiimide, cyclodextrin, crown ether, cryptand, diaminopyridine, diazonium compounds, ester, ether, epoxide, fullerene, glyoxal, halide, imide, imine, imidoester, ketone, nitrile, isothiocyanate, isocyanate, isonitrile, lactone, maleimide, metallocene, NHS ester, nitroalkane, nitro compounds, nucleotide, oligosaccharide, oxirane, peptide, phenol, phthalocyanine, porphyrin, phosphine, phosphonate, polyimine (2,2'-bipyridine, 1,10-phenanthroline, terpyridine, pyridazine, pyrimidine, purine, pyrazine, 1,8-naphthyridine, polyhedral oligomeric silsequioxane (POSS), pyrazolate, imidazolate, torand, hexapyridine, 4,4'-bipyrimidine, for example), pyridine, quaternary ammonium salt, quaternary phosphonium salt, quinone, Schiff base, selenide, sepulchrate, silane, sulfide, sulfone, sulfonyl chloride, sulfonic acid, sulfonic acid ester, sulfonium salt, sulfoxide, sulfur and selenium compounds, thiol, thioether, thiol acid, thio ester, thymine, or a combination thereof.

For example, a poly(aryleneethynylene) of structure I., where $Ar_1$ and $Ar_2$ are phenyl, and x and y are 4, may have substituent groups as follows:

i) $R_1=R_4=H$ and $R_2=R_3=OC_{10}H_{21}$,
ii) $R_1=R_2=R_3=R_4=F$,
iii) $R_1=R_4=H$ and $R_2=R_3=$

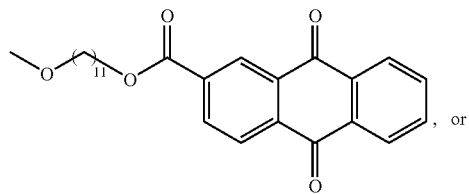, or iiii) $R_1=R_4=H$ and $R_2=R_3=$

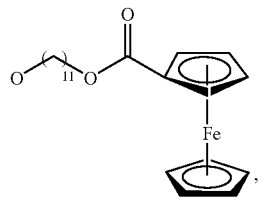, or any combination thereof.

Further, a substituent group $R_1$, $R_2$, $R_3$, and $R_4$ may be H, $OC_{10}H_{21}$, F,

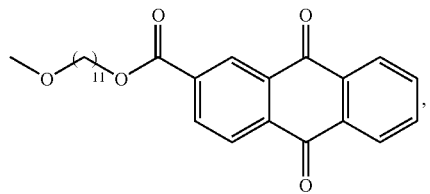,

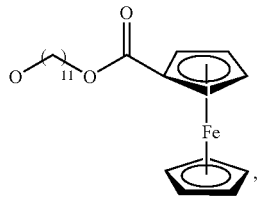, $CH_2-O-C_{10}H_{21}$, $CH_2-NH(C_{10}H_{21})$, $CH_2-N(C_{10}H_{21})_2$, or $OCH_2COX$ (where X is a secondary amine, primary amine, alkoxy group, amide group, or an acid group, for example). In general, an H substituent is not considered a functional group for solubilizing nanomaterial.

In certain embodiments, the at least one functional R group is independently alkoxy, alkyl, aryl, halo, or a combination thereof, thereby providing a functional group for solubilizing nanomaterial.

A synthesis procedure for making polymers having such functional substituents would vary from the procedure provided below in that the starting materials would contain the appropriate substituent groups. One of ordinary skill in the art in light of the present disclosure is able to determine starting materials for polymers of the present invention.

Substituents on the polymer backbone may increase the stability of the polymer to temperatures such as up to 150° C. to 350° C., for example. In general, aliphatic side chains tend to provide the polymer with greater temperature stability.

In further embodiments, the at least one functional group is present at the periphery of a substituent group. The term "periphery," as used herein, means at the outer end of a substituent side chain, away or distal from the polymer backbone. In certain embodiments, the functional group is alkoxy or alkyl, bound directly to the backbone portion of the polymer or bound at the periphery of a substituent group. In further embodiments, the functional group is $CH_2-O-C_{10}H_{21}$, $CH_2-NH(C_{10}H_{21})$, $CH_2-N(C_{10}H_{21})_2$, or $OCH_2COX$ (where X is a secondary amine, primary amine, alkoxy group, amide group, or an acid group, for example).

Polymers of the present embodiments have end terminal groups (as distinguished from side chain terminal groups) provided by a polymerization-terminating haloaryl agent as described below. In certain embodiments, the terminal groups are alkoxyaryl groups such as methoxyaryl, ethoxyaryl, or propoxyaryl, for example. In further embodiments, the terminal groups are haloalkoxyaryl when the polymerization-terminating haloaryl agent is a dihaloaryl agent.

Methods of Making Polymers for Solubilizing Nanomaterial: A method of making a rigid poly(aryleneethynylene) polymer of the present invention comprises coupling a para-diethynyl-$(R_1-R_x)$arylene and an $(R_1-R_y)$-para-dihaloarylene in the presence of a first polymerization-terminating haloaryl agent under conditions and for a period of time to produce fluorescence; and terminating the coupling by addition of a second polymerization-terminating haloaryl agent, the second haloaryl agent having equal to or greater activity for coupling as compared to the $(R_1-R_y)$-para-dihaloarylene. For this method of making a rigid poly (aryleneethynylene) polymer, each R of $(R_1-R_x)$ and $(R_1-R_y)$ is independently H, or a functional group for solubilizing nanomaterial, and at least one R of $(R_1-R_x)$ and $(R_1-R_y)$ is a functional group for solubilizing nanomaterial, wherein x of $(R_1-R_x)$ is the maximum number of substituents on the para-diethynyl-$(R_1-R_x)$arylene, and y of $(R_1-R_y)$ is the maximum number of substituents on the $(R_1-R_y)$-para-dihaloarylene. In one embodiment of the present method, the arylene of the para-diethynyl-$(R_1-R_x)$arylene and the arylene of the $(R_1-R_y)$-para-dihaloarylene are the same arylene structure.

A method of making a rigid poly(ferrocenylaryleneethynylene) polymer of the present invention comprises coupling a 1,1'-diethynyl-$(R_1-R_8)$ferrocene and an $(R_1-R_z)$-para-dihaloarylene, or coupling a 1,1'-dihalo-$(R_1-R_8)$ferrocene and a para-diethynyl-$(R_1-R_z)$arylene, in the presence of a first polymerization-terminating haloaryl agent under conditions for a period of time to produce fluorescence; and terminating the coupling by addition of a second polymerization-terminating haloaryl agent, the second haloaryl agent having equal or greater activity for coupling as compared to the $(R_1-R_z)$-para-dihaloarylene or the 1,1'-dihalo-$(R_1-R_8)$ferrocene. For this method of making a rigid poly(ferrocenylaryleneethynylene) polymer, each R of $(R_1-R_8)$ and $(R_1-R_z)$ is independently H, or a functional group for solubilizing nanomaterial, and at least one R of $(R_1-R_8)$ and $(R_1-R_z)$ is a functional group for solubilizing nanomaterial, and z of $(R_1-R_z)$ is the maximum number of substituents on the $(R_1-R_z)$-para-dihaloarylene.

A method of making a rigid poly(ferrocenylethynylene) polymer of the present invention comprises coupling a 1,1'-diethynyl-$(R_1-R_8)$ferrocene and an $(R_1-R_8)$-1,1'-dihaloferrocene in the presence of a first polymerization-terminating haloaryl agent under conditions for a period of time to produce fluorescence; and terminating the coupling by addition of a second polymerization-terminating haloaryl agent, the second haloaryl agent having equal or greater activity for coupling as compared to the $(R_1-R_8)$-1,1'-dihaloferrocene. For this method of making a rigid poly(ferrocenylethynylene) polymer, each R of $(R_1-R_8)$ is independently H, or a functional group for solubilizing nanomaterial, and at least one R of $(R_1-R_8)$ is a functional group for solubilizing nanomaterial. Corresponding R groups of the 1,1'-diethynyl-$(R_1-R_8)$ferrocene and the $(R_1-R_8)$-1,1'-dihaloferrocene are identical.

In general, polymer synthesis is carried out using palladium-catalyzed coupling procedures of Bunz, U. H. F. (*Chem. Rev.* 2000, 100, 1605), McQuade et al., (*J. Am. Chem. Soc.* 2000:122, 12389), or Erdogan, et al., (*Macromolecules* 2002:35, 7863) with modifications as described herein. In order to achieve length and polydispersity of polymer embodiments of the present invention, the coupling is carried out at least for a period of time to produce fluorescence due to production of salts of the reaction.

Coupling is generally carried out at a temperature of about room temperature to about 80° C. Side reactions occur at the higher temperatures of that range and the coupling is slow at the lower temperatures of that range. Coupling temperatures are also dependent upon particular reactants, for example, the coupling of an iodo-derivatized reactant takes place at a lower temperature than the coupling of a bromo-derivatized reactant. In certain embodiments, coupling is conducted at a lower temperature for a period of time, followed by a period of time at a higher temperature. A lower temperature is, for example, about room temperature. A higher temperature is, for example, about 70° C. Coupling may be carried out at a temperature between nd including any of room temperature, 30° C., 35° C., 40° C., 45° C., 50° C., 55° C., 60° C., 65° C., 70° C., 75° C., and 80° C. In further embodiments coupling is carried out at room temperature for a period of time and then at a temperature between about 50° C. and about 80° C., about 60° C. and about 75° C., or about 70° C. for a period of time.

The length of time of the coupling reaction is a few minutes to up to a week. In certain embodiments, the coupling is at room temperature for a period of time of a few minutes to a few hours, for example, a period of time between and including any of 5 min., 10 min., 20 min., 30 min., 40 min., 50 min., 1 hr., 1.5 hr., 2 hr., or 3 hr., then coupling is continued at a temperature of less than about 80° C. for about 6 h to 48 h. In certain embodiments, the second temperature is between about 50° C. and about 80° C., about 60° C. and about 75° C., or about 70° C. for a period of time of about 12 hr. to about 36 hr., about 18 hr. to about 24 hr., or about 24 hr.

Coupling is carried out in the presence of a first polymerization-terminating haloaryl agent. Such an agent encourages polymerization from one end instead of both ends of the polymer and contributes to uniformity of polymer product size. Coupling is terminated by incubation with a second polymerization-terminating haloaryl agent. The second polymerization-terminating haloaryl agent may be the same agent as the first polymerization-termination haloaryl agent. The second polymerization-terminating haloaryl agent has equal or greater activity for coupling as compared to the $(R_1-R_z)$-para-dihaloarylene or the 1,1'-dihalo-$(R_1-R_8)$ferrocene of the coupling reaction. The first or second haloaryl agent may have more than one halo group.

In certain embodiments of the present invention, the first or second polymerization-terminating haloaryl agent comprises an iodo- or bromo-derivatized alkoxyarylene, alkylarylene, or alkylaryloate. Exemplary iodoalkoxyarylene agents are iodoanisole, iodoethoxybenzene, or iodopropoxybenzene, where the alkoxy has one to ten carbons, or a combination thereof, for example. Exemplary iodoalkylarylene agents are 4-iodoalkylbenzene, or 2-iodoalkylbenzene where the alkyl has one to 10 carbons. Exemplary iodoalkylaryloate agents are 4-iodoalkylbenzoate, or 2-iodoalkylbenzoate where the alkyl group has from one to 10 carbons, for example. Exemplary bromoalkoxyarylene agents are bromoanisole, bromoethoxybenzene, or bromopropoxybenzene, where the alkoxy has one to ten carbons, or a combination thereof, for example. Exemplary bromoalkylarylene agents are 4-bromoalkylbenzene, or 2-bromoalkylbenzene where the alkyl group has from one to 10 carbons. Exemplary bromoalkylaryloate agents are 4-bromoalkylbenzoate, or 2-bromoalkylbenzoate where the alkyl group has from one to 10 carbons, for example.

The polymerization-terminating haloaryl agent is added under conditions of time and temperature that provide for uniformity of polymer size as described herein, thereby accomplishing a polydispersity of less than about 2. Polydispersity of the resultant polymer is determined by gel permeation chromatography, for example. The number of repeating units of the polymer is determined by proton NMR.

Nanomaterial: The term "nanomaterial," as used herein, includes, but is not limited to, multi-wall carbon or boron nitride nanotubes, single-wall carbon or boron nitride nanotubes, carbon or boron nitride nanoparticles, carbon or boron nitride nanofibers, carbon or boron nitride nanoropes, carbon or boron nitride nanoribbons, carbon or boron nitride nanofibrils, carbon or boron nitride nanoneedles, carbon or boron nitride nanosheets, carbon or boron nitride nanorods, carbon or boron nitride nanohorns, carbon or boron nitride nanocones, carbon or boron nitride nanoscrolls, graphite nanoplatelets, graphite nanoparticles, nanodots, other fullerene materials, or a combination thereof. The term, "multi-wall," is meant to include double-wall nanotubes (DWNTs) and few-wall nanotubes (FWNTs).

SWNTs produced by high pressure carbon monoxide process (HiPco) were purchased from Carbon Nanotechnologies, Inc. (Houston, Tex.) as used herein in the present examples, however, nanomaterial made by the arc discharge, laser vaporization, or other methods known to one of skill in the art in light of the present disclosure may be used.

Boron nitride nanotubes and methods for their manufacture are known to those of ordinary skill in the art. See e.g., Han et al. (*Applied Physics Letters* 73(21) pp. 3085–3087, 1998), Chen et al. (*Materials Science Forum* Vols. 312–314 (1999) pp. 173–178), the *Journal of Metastable and Nanocrystalline Materials* Vols. 2–6 (1999) pp. 173–178, and 1999 *Trans Tech Publications*, Switzerland.

The term "nanotubes" is used broadly herein and, unless otherwise qualified, is intended to encompass any type of nanomaterial. Generally, a "nanotube" is a tubular, strand-like structure that has a circumference on the atomic scale. For example, the diameter of single walled nanotubes typically ranges from approximately 0.4 nanometers (nm) to approximately 100 nm, and most typically have diameters ranging from approximately 0.7 nm to approximately 5 nm.

While the term "SWNTs," as used herein, means single walled nanotubes, the term means that other nanomaterials as cited supra may be substituted unless otherwise stated herein.

Solutions of Processed Nanomaterial: A method of solubilizing nanomaterials using a solubilizing polymer in accordance with certain embodiments of the present invention includes mixing nanomaterial; a poly(aryleneethynylene) polymer, a poly(ferrocenylaryleneethynylene) polymer, a poly(ferrocenylethynylene) polymer, or a combination thereof as set forth herein; and a solubilization solvent to form a solution. The term "mixing," as used herein, means that the nanomaterial and the solubilizing polymer are brought into contact with each other in the presence of the solvent. "Mixing" may include simply vigorous shaking, or may include sonication for a period of time of about 10 min. to about 3 hr. A further optional step of solubilizing nanomaterials using a solubilizing polymer of the present invention may include a pre-sonication of nanomaterial in the solvent for about 30 min. to about 3 hr., for example.

A solubilization solvent may be organic or aqueous such as, for example, $CHCl_3$, chlorobenzene, water, acetic acid, acetone, acetonitrile, aniline, benzene, benzonitrile, benzyl alcohol, bromobenzene, bromoform, 1-butanol, 2-butanol, carbon disulfide, carbon tetrachloride, chlorobenzene, chloroform, cyclohexane, cyclohexanol, decalin, dibromethane, diethylene glycol, diethylene glycol ethers, diethyl ether, diglyme, dimethoxymethane, N,N-dimethylformamide, ethanol, ethylamine, ethylbenzene, ethylene glycol ethers, ethylene glycol, ethylene oxide, formaldehyde, formic acid, glycerol, heptane, hexane, iodobenzene, mesitylene, methanol, methoxybenzene, methylamine, methylene bromide, methylene chloride, methylpyridine, morpholine, naphthalene, nitrobenzene, nitromethane, octane, pentane, pentyl alcohol, phenol, 1-propanol, 2-propanol, pyridine, pyrrole, pyrrolidine, quinoline, 1,1,2,2-tetrachloroethane, tetrachloroethylene, tetrahydrofuran, tetrahydropyran, tetralin, tetramethylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene, m-xylene, o-xylene, p-xylene, 1,2-dichlorobenzene, 1,3-dichlorobenzene, 1,4-dichlorobenzene, 1,2-dichloroethane, N-methyl-2-pyrrolidone, methyl ethyl ketone, dioxane, or dimethyl sulfoxide. In certain embodiments of the present invention, the solubilization solvent is a halogenated organic solvent and, in further embodiments, the solubilization solvent is chlorobenzene.

A solution of processed nanomaterial comprising nanomaterial as described herein, a solubilizing polymer as described herein and a solubilization solvent as described herein is an embodiment of the present invention.

The interaction between polymer and nanomaterial in polymer-solubilized nanomaterial is noncovalent bonding instead of covalent bonding. Therefore, the underlying electronic structure of the nanomaterial and its key attributes are not affected.

The processed nanomaterial may comprise an amount of solubilizing polymer by weight ratio of greater than zero and less than 1.0; an amount equal to or within a range of any of the following weight ratios: 0.05, 0.10, 0.15, 0.20, 0.25, 0.30, 0.33, 0.35, 0.40, 0.45, 0.50, 0.60, 0.70, 0.80, and 0.90; an amount by weight ratio equal to or greater than 0.15 and less than or equal to 0.40; an amount by weight ratio equal to or greater than 0.20 and less than or equal to 0.35, or an amount by weight ratio of about 0.33.

Processed nanomaterials dissolved in solvent do not settle out even over a period of weeks. While the nanomaterials can be filtered out on filter paper, this separation is more a function of their large size, not their solubility. A sufficiently fine filter can separate most solvated molecules. The terms "solubilization" and "dispersion" are used interchangeably herein.

Dispersion or solubilization is determined using analysis of photographs of an aliquot of the dispersion. A photograph of nanomaterial without solubilizing polymers is analyzed as a control. For example, an aliquot (1 mL) of each of a series of nanotube solutions having known and increasing concentrations of nanotubes and lacking solubilizing polymer is photographed. Nanotubes are dispersed and two different zones are observed: dark zones (aggregates of nanotubes) and clear zones (absence of nanotubes due to the non-dispersion of nanotubes). This series provides a standard reference control. An aliquot (1 mL) of a solution of polymer-solubilized nanotubes with a known concentration of nanotubes and solubilizing polymer is photographed and compared to the control. Highly uniform dispersion is observed in a solubilized sample.

Solid Processed Nanomaterial obtained from Solution by Removing Solvent,: Solid processed nanomaterial is obtained from the solutions of processed nanomaterial as described above by removing the solvent by one of many standard procedures well known to those of ordinary skill in the art. Such standard procedures include drying by evaporation such as by evaporation under vacuum or evaporation with heat, casting, precipitation or filtration and the like. A solvent for precipitating solid processed nanomaterials has a polarity that is opposite in the polarity of the polymer backbone side chains. For material obtained by methods of the present invention, the solid material is generally black in color with a uniform network of carbon nanotubes. Solid material may be pulverized to produce a powder.

Removed solvent may be recycled by collection under vacuum and trapping in liquid nitrogen. Such recycled solvent may be used without further purification.

Solid nanomaterial has advantages over solutions of nanomaterial such as easier shipping, handling, storage, and a longer shelf life.

Re-solubilized Processed Nanomaterial: Solid processed nanomaterial obtained as described above is re-solubilized by mixing the solid processed nanomaterial with a re-solubilization solvent. The term "mixing," as used herein for re-solubilization, means that the solid processed nanomaterial and the re-solubilization solvent are brought into contact with each other. "Mixing" for re-solubilization may include simply vigorous shaking, or may include sonication for a period of time of about 10 min to about 3 h.

The re-solubilization solvent may be the same solvent as the solubilization solvent or may be a different solvent. Accordingly, the re-solubilization solvent may be organic or aqueous such as, for example, $CHCl_3$, chlorobenzene, water, acetic acid, acetone, acetonitrile, aniline, benzene, benzonitrile, benzyl alcohol, bromobenzene, bromoform, 1-butanol, 2-butanol, carbon disulfide, carbon tetrachloride, chlorobenzene, chloroform, cyclohexane, cyclohexanol, decalin, dibromethane, diethylene glycol, diethylene glycol ethers, diethyl ether, diglyme, dimethoxymethane, N,N-dimethylformamide, ethanol, ethylamine, ethylbenzene, ethylene glycol ethers, ethylene glycol, ethylene oxide, formaldehyde, formic acid, glycerol, heptane, hexane, iodobenzene, mesitylene, methanol, methoxybenzene, methylamine, methylene bromide, methylene chloride, methylpyridine, morpholine, naphthalene, nitrobenzene, nitromethane, octane, pentane, pentyl alcohol, phenol, 1-propanol, 2-propanol, pyridine, pyrrole, pyrrolidine, quinoline, 1,1,2,2-tetrachloroethane, tetrachloroethylene, tetrahydrofuran, tetrahydropyran, tetralin, tetramethylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene, m-xylene, o-xylene, p-xylene, 1,2-dichlorobenzene, 1,3-dichlorobenzene, 1,4-dichlorobenzene, 1,2-dichloroethane, N-methyl-2-pyrrolidone, methyl ethyl ketone, dioxane, or dimethyl sulfoxide. In certain embodiments of the present invention, the re-solubilization solvent is a halogenated organic solvent such as 1,1,2,2-tetrachloroethane, chlorobenzene, chloroform, methylene chloride, or 1,2-dichloroethane and, in further embodiments, the re-solubilization solvent is chlorobenzene.

A solution of re-solubilized solid processed nanomaterials comprising solid processed nanomaterial as described herein, and a re-solubilization solvent as described herein is an embodiment of the present invention.

Processed nanomaterial of the present embodiments has been re-solubilized at concentrations of greater than 0.2 mg/mL. Concentrations of re-solubilized material greater than 1.0 mg/mL have been obtained using compositions and methods of the present embodiments.

Insoluble Processed Nanomaterial: Re-solubilized processed nanomaterial may be cast into a desired shape, and heated at about 120° C. to about 200° C. to produce insoluble processed nanomaterial. The heating may occur at a temperature between and including 120° C., 130° C., 140° C., 150° C., 160° C., 170° C., 180° C., 190° C., and 200° C. Insoluble material is useful particularly in layered structural materials.

Product-by–Process: Polymers, processed nanomaterial, solutions of such processed nanomaterial, solids of processed nanomaterials, re-solubilized solutions of processed nanomaterial, and insoluble processed nanomaterial made by a method of the present invention are embodiments of the present invention. For example, a poly(aryleneethynylene) polymer, a poly(ferrocenylaryleneethynylene) polymer or a poly(ferrocenylethynylene) polymer, made by methods described herein, a solution thereof made by methods as described herein, a solid material made therefrom by methods described herein, a re-solubilized material made therefrom by methods described herein, and insoluble solids made by methods described herein are embodiments of the present invention.

Composites of Processed Nanomaterial: Composites of processed nanomaterial as provided herein dispersed within a host matrix are embodiments of the present invention. The host matrix may be a host polymer matrix or a host non-polymer matrix as described in U.S. patent application Ser. No. 10/850,721 filed May 21, 2004, the entire contents of which is incorporated by reference herein.

The term "host polymer matrix," as used herein, means a polymer matrix within which the processed nanomaterial is dispersed. A host polymer matrix may be an organic polymer matrix or an inorganic polymer matrix, or a combination thereof.

Examples of a host polymer matrix include a nylon, polyethylene, epoxy resin, polyisoprene, sbs rubber, polydicyclopentadiene, polytetrafluoroethulene, poly(phenylene sulfide), poly(phenylene oxide), silicone, polyketone, aramid, cellulose, polyimide, rayon, poly(methyl methacrylate), poly(vinylidene chloride), poly(vinylidene fluoride), carbon fiber, polyurethane, polycarbonate, polyisobutylene, polychloroprene, polybutadiene, polypropylene, poly(vinyl chloride), poly(ether sulfone), poly(vinyl acetate), polystyrene, polyester, polyvinylpyrrolidone, polycyanoacrylate, polyacrylonitrile, polyamide, poly(aryleneethynylene), poly(phenyleneethynylene), polythiophene, thermoplastic, thermoplastic polyester resin (such as polyethylene terephthalate), thermoset resin (e.g., thermosetting polyester resin or an epoxy resin), polyaniline, polypyrrole, or polyphenylene such as PARMAX®, for example, other conjugated polymers (e.g., conducting polymers), or a combination thereof.

Further examples of a host polymer matrix includes a thermoplastic, such as ethylene vinyl alcohol, a fluoroplastic such as polytetrafluoroethylene, fluoroethylene propylene, perfluoroalkoxyalkane, chlorotrifluoroethylene, ethylene chlorotrifluoroethylene, or ethylene tetrafluoroethylene, ionomer, polyacrylate, polybutadiene, polybutylene, polyethylene, polyethylenechlorinates, polymethylpentene, polypropylene, polystyrene, polyvinylchloride, polyvinylidene chloride, polyamide, polyamide-imide, polyaryletherketone, polycarbonate, polyketone, polyester, polyetheretherketone, polyetherimide, polyethersulfone, polyimide, polyphenylene oxide, polyphenylene sulfide, polyphthalamide, polysulfone, or polyurethane. In certain embodiments, the host polymer includes a thermoset, such as allyl resin, melamine formaldehyde, phenol-fomaldehyde plastic, polyester, polyimide, epoxy, polyurethane, or a combination thereof.

Examples of inorganic host polymers include a silicone, polysilane, polycarbosilane, polygermane, polystannane, a polyphosphazene, or a combination thereof.

More than one host matrix may be present in a nanocomposite. By using more than one host matrix, mechanical, thermal, chemical, or electrical properties of a single host matrix nanocomposite are optimized by adding processed nanomaterial to the matrix of the nanocomposite material. For example, addition of polycarbonate in addition to epoxy appears to reduce voids in a nanocomposite film as compared to a nanocomposite film with just epoxy as the host polymer. Such voids degrade the performance of nanocomposites.

In one embodiment, using two host polymers is designed for solvent cast epoxy nanocomposites where the processed nanomaterial, the epoxy resin and hardener, and the polycarbonate are dissolved in solvents and the nanocomposite film is formed by solution casting or spin coating.

Host nonpolymer matrix: The term "host nonpolymer matrix," as used herein, means a nonpolymer matrix within which the nanomaterial is dispersed. Examples of host nonpolymer matrices include a ceramic matrix (such as silicon carbide, boron carbide, or boron nitride), or a metal matrix (such as aluminum, titanium, iron, or copper), or a combination thereof. Processed nanomaterial is mixed with, for example, polycarbosilane in organic solvents, and then the solvents are removed to form a solid (film, fiber, or powder). The resulting nanocomposite is further converted to SWNTs/SiC nanocomposite by heating at 900–1600° C. either under vacuum or under inert atmosphere (such as Ar).

A further embodiment of the invention is the above-cited nanocomposite wherein the processed nanomaterial of the nanocomposite is a primary filler and the nanocomposite further comprises a secondary filler to form a multifunctional nanocomposite. In this embodiment, the secondary filler comprises a continuous fiber, a discontinuous fiber, a nanoparticle, a microparticle, a macroparticle, or a combination thereof. In another embodiment, the processed nanomaterial of the nanocomposite is a secondary filler and the continuous fiber, discontinuous fiber, nanoparticle, microparticle, macroparticle, or combination thereof, is a primary filler.

Multifunctional nanocomposites: Nanocomposites can themselves be used as a host matrix for a secondary filler to form a multifunctional nanocomposite. Examples of a secondary filler include: continuous fibers (such as carbon fibers, carbon nanotube fibers, carbon black (various grades), carbon rods, carbon nanotube nanocomposite fibers, KEVLAR® fibers, ZYLON® fibers, SPECTRA® fibers, nylon fibers, VECTRAN® fibers, Dyneema Fibers, glass fibers, or a combination thereof, for example), discontinuous fibers (such as carbon fibers, carbon nanotube fibers, carbon nanotube nanocomposite fibers, KEVLAR® fibers, ZYLON® fibers, SPECTRA® fibers, nylon fibers, or a combination thereof, for example), nanoparticles (such as metallic particles, polymeric particles, ceramic particles, nanoclays, diamond particles, or a combination thereof, for example), and microparticles (such as metallic particles, polymeric particles, ceramic particles, clays, diamond particles, or a combination thereof, for example). In a further embodiment, the continuous fiber, discontinuous fiber, nanoparticle, microparticle, macroparticle, or combination thereof, is a primary filler and the nanoprocessed material is a secondary filler.

A number of existing materials use continuous fibers, such as carbon fibers, in a matrix. These fibers are much larger than carbon nanotubes. Adding processed nanomaterial to the matrix of a continuous fiber reinforced nanocomposite results in a multifunctional nanocomposite material having improved properties such as improved impact resistance, reduced thermal stress, reduced microcracking, reduced coefficient of thermal expansion, or increased transverse or through-thickness thermal conductivity. Resulting advantages of multifunctional nanocomposite structures include improved durability, improved dimensional stability, elimination of leakage in cryogenic fuel tanks or pressure vessels, improved through-thickness or inplane thermal conductivity, increased grounding or electromagnetic interference (EMI) shielding, increased flywheel energy storage, ortailored radio frequency signature (Stealth), for example.

Improved thermal conductivity also could reduce infrared (IR) signature. Further existing materials that demonstrate improved properties by adding processed nanomaterial include metal particle nanocomposites for electrical or thermal conductivity, nano-clay nanocomposites, or diamond particle nanocomposites, for example.

Articles of manufacture: An article of manufacture comprising a polymer, a solution, a solid, a re-solubilized solid, or an insoluble solid as set forth herein is an embodiment of the present invention. Such articles of manufacture include, for example, epoxy and engineering plastic composites, filters, actuators, adhesive composites, elastomer composites, materials for thermal management (interface materials, spacecraft radiators, avionic enclosures and printed circuit board thermal planes, materials for heat transfer applications, such as coatings, for example), aircraft, ship infrastructure and automotive structures, improved dimensionally stable structures for spacecraft and sensors, reusable launch vehicle cryogenic fuel tanks and unlined pressure vessels, fuel lines, packaging of electronic, optoelectronic or microelectromechanical components or subsystems, rapid prototyping materials, fuel cells, medical materials, composite fibers, or improved flywheels for energy storage, for example.

The following examples are presented to further illustrate various aspects of the present invention, and are not intended to limit the scope of the invention.

EXAMPLE 1

Synthesis of Nanomaterial-Solubilizing Polymer

An exemplary poly(aryleneethynylene) polymer having structure I. where $Ar_1$ and $Ar_2$ are phenyl, x and y are 4, two para R's are H and two para R's are $OC_{10}H_{21}$, and n is a number of repeating units is synthesized for use in solubilizing nanomaterials:

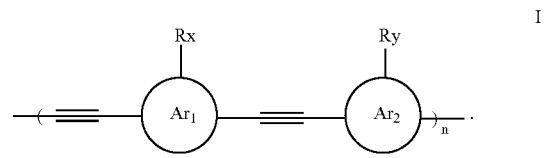

Such a poly(aryleneethynylene) polymer is a poly(phenyleneethynylene) polymer and is synthesized by reacting 1,4-didecyloxy-2,5-diiodobenzene (2) with 1,4-diethynyl-2,5-didecyloxybenzene (4), which reactants are synthesized according to the following Scheme 1:

Scheme 1: Synthesis of Reactants (2) and (4)

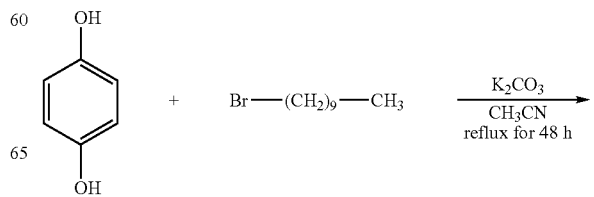

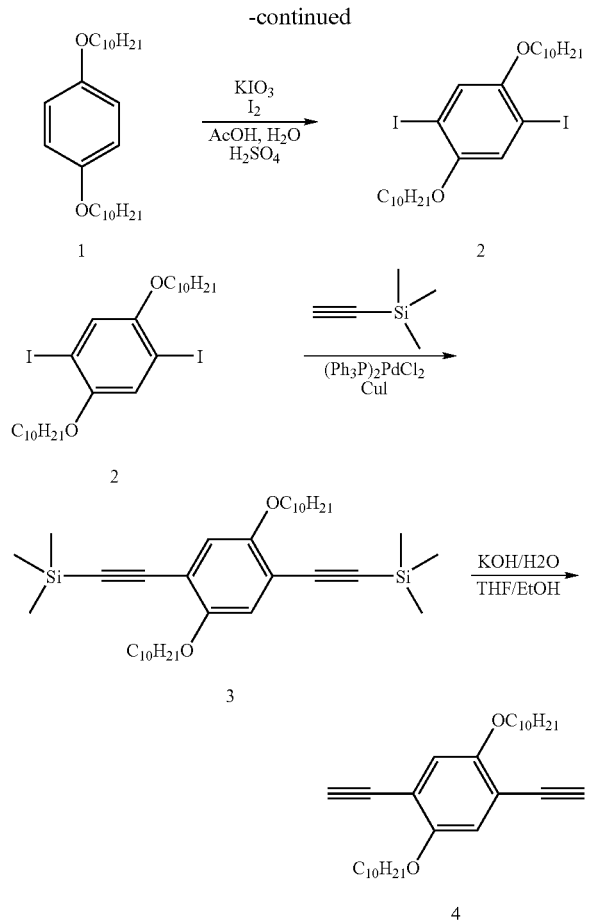

Synthesis of 1,4-Didecyloxybenzene (1)

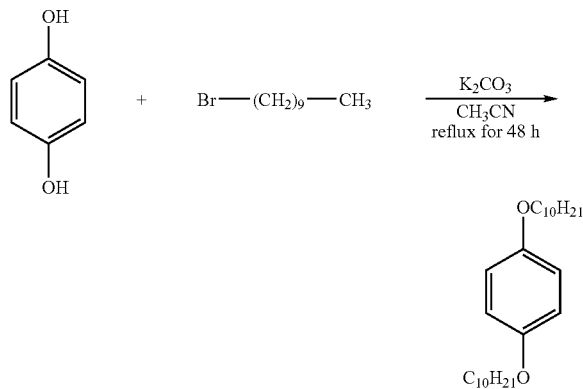

A 1-L, three-necked flask, equipped with a reflux condenser and mechanical stirrer is charged under argon atmosphere with 1,4-hydroquinone (44.044 g, 0.4 mol) and potassium carbonate, $K_2CO_3$, (164.84 g, 1.2 mol), and acetonitrile (ACS grade, 500 mL). 1-Bromodecane (208.7 mL, 1.0 mol) is added and the reaction mixture is then heated to reflux under argon flow for 48 h. The hot solution is poured into an Erlenmeyer flask charged with water (1.5 L) and stirred with a magnetic bar stirrer to precipitate the product. The beige precipitate is then collected by filtration using a Buchner funnel with a fritted disc, washed with water (1.0 L), dried, and then dissolved in hot hexanes (ACS grade, 250 mL). The resulting hot hexanes solution is added slowly into an Erlenmeyer flask charged with ethanol (tech. grade, 1.5 L) and vigorously stirred to precipitate the product. The mixture is stirred for at least 2 hr then the white precipitate is collected by filtration on a Buchner funnel equipped with a fritted disc, washed with cooled ethanol (tech. grade, 0.5 L), and dried under vacuum pressure for 12 hr to give 151.5 g. (97% yield) of a fluffy white solid. $^1$H NMR (CDCl$_3$) δ 6.83 (s, 4H), 3.92 (t, J=6.6 Hz, 4H), 1.73 (m, 4H), 1.45 (m, 4H), 1.30 (m, 22H), 0.91 (t, J=6.7 Hz, 6H).

Synthesis of 1,4-Didecyloxy-2,5-diiodobenzene (2)

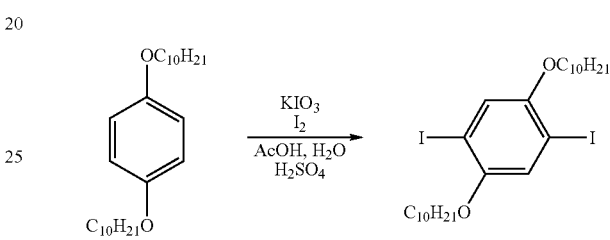

A 1-L, two-necked flask equipped with a reflux condenser, and magnetic bar stirring is charged with potassium iodate, KIO$_3$, (15.20 g, 0.066 mol), iodine (36.90 g, 0.132 mol), acetic acid (700 mL), water (50 mL), and sulfuric acid (15 mL). 1,4-didecyloxybenzene (1) (51.53 g, 0.132 mol) is added to the solution and the reaction mixture is then heated to reflux for 8 hours. The purple solution is allowed to cool down to room temperature under constant agitation and saturated aqueous solution of sodium thiosulphate (100 mL) is added until the brown iodine color is gone. The beige-brown precipitate is collected by filtration using a Buchner funnel equipped with a fritted disc, washed with water (700 mL), ethanol (500 mL), and dried. This solid is then dissolved in hot hexanes (300 mL). The resulting hot hexanes solution is poured slowly into an Erlenmeyer flask charged with ethanol (1.5 L) and vigorously stirred to give a white precipitate. This precipitate is collected by filtration, washed with ethanol (1.0 L), and dried under vacuum overnight to give 78.10 g (92% yield) of pure white solid. $^1$H NMR (CDCl$_3$) δ 7.21 (s, Ph, 2H), 3.94 (t, J=6.4 Hz, OCH$_2$, 4H), 1.82 (m, CH$_2$, 4H), 1.47 (m, CH$_2$, 4H), 1.29 (m, CH$_2$, 22H), 0.90 (t, J=6.72 Hz, CH$_3$, 6H). 13C NMR (CDCl3) d 152.8, 122.7, 86.2, 70.3, 31.9, 29.5, 29.3, 29.2, 29.1, 26.0, 22.6, 14.1.

Synthesis of 1,4-Didecyloxy-2,5-bis-(trimethylsilyl-ethynyl)benzene (3)

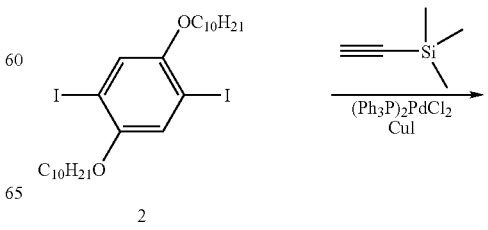

-continued

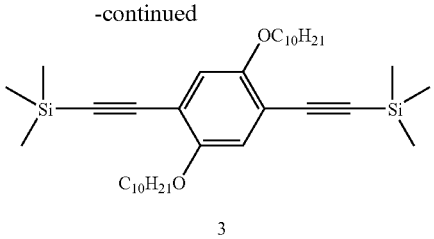

3

To a degassed 1.5 L of diisopropylamine is added 1,4-didecyloxy-2,5-diiodobenzene (2) intermediate (100.0 g, 0.1557 mol), CuI (1.48 g, 0.00778 mol), and dichlorobis(triphenylphosphine)palladium(II) (5.46 g, 0.00778 mol). The reaction mixture is stirred for 10 minutes and trimethylsilylacetylene (48.4 mL, 0.342 mol) is added slowly over 15–30 minutes at room temperature. The diisopropylammonium salts are formed during the addition and at the end of the addition the solution is dark brown. After the addition is completed, the reaction mixture is stirred at reflux for 8 h. After cooling, the mixture is diluted with hexanes (500 mL) and filtered through a 4 cm plug of silica gel. The solvent is removed and the product is precipitated from chloroform/EtOH (1:5, 1.5 L). The solid is filtered, washed with water (250 mL), washed with EtOH (250 mL) and dried to give 81.8 g of the desired product as a white solid. Yield (91%). $^1$H NMR (CDCl$_3$) δ 6.85 (s, Ph, 2H), 3.93 (t, J=6.4 Hz, OCH$_2$, 4H), 1.78 (m, CH$_2$, 4H), 1.27 (m, CH$_2$, 22H), 0.88 (t, J=6.42 Hz, CH$_3$, 6H), 0.26 (s, 18H). 13C NMR (CDCl$_3$) d 154.0, 117.2, 113.9, 101.0, 100.0, 69.4, 31.9, 29.6, 29.5, 29.4, 29.3, 26.0, 22.6, 14.1, 0.17.

Synthesis of 1,4-Diethynyl-2,5-didecyloxybenzene (4)

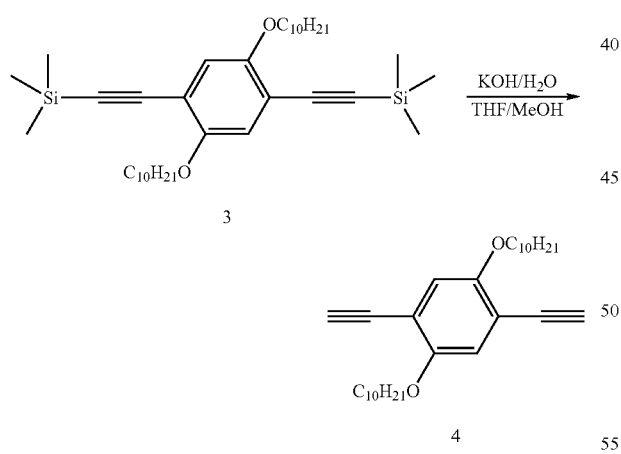

Methanol (200 mL) and 120 mL of 20% KOH are added to a rapidly stirred solution of 1,4-didecyloxy-2,5-bis(trimethylsilylethynyl) benzene (3) (80.0 g, 137.21 mmol) in THF (500 mL) at room temperature. The reaction mixture is stirred overnight. The THF is then removed under reduced pressure and the residue is diluted with EtOH (400 mL). A pale yellow solid is filtered, washed with EtOH (250 mL), and dried to give 60.05 g of the desired pale yellow product. Yield (99.7%). $^1$H NMR (CDCl$_3$) δ 6.96 (s, Ph, 2H), 3.98 (t, J=6.58 Hz, OCH$_2$, 4H), 3.34 (s, CCH, 2H), 1.82 (m, CH$_2$, 4H), 1.52 (m, CH$_2$, 4H), 1.31 (m, CH$_2$, 22H), 0.88 (t, J=6.71 Hz, CH$_3$, 6H). 13C NMR (CDCl$_3$) d 153.9, 117.7, 113.2, 82.4, 79.7, 69.6, 31.9, 29.5, 29.3, 29.1, 25.9, 22.6, 14.1.

Synthesis of Poly(aryleneethynylene) Polymer having Structure I.: A 1-L, oven dried three-necked flask, equipped with a reflux condenser, and magnetic stir bar was charged with toluene/diisopropylamine (7:3; 800 mL) and was degassed at room temperature by constant argon bubbling for 3 h. 1,4-Diethynyl-2,5-didecyloxybenzene (4) (13.0 g, 14.82 mmol), 1,4-didecyloxy-2,5-diiodobenzene (2) (8.66 g, 13.48 mmol), (PPh$_3$)$_4$Pd (0.62 g, 0.54 mmol), 2-iodoanisole (0.26 mL, 15 mol %), and CuI (0.206 g, 0.54 mmol) were added under argon atmosphere. The reaction mixture was stirred at room temperature for 30 minutes and then warmed at 70° C. for 24 h. Diisopropylammonium salts were formed immediately after the start of the reaction and the reaction mixture became highly fluorescent.

After 24 h, an additional 2.0 mL of iodoanisole was added to stop the polymer propagation and the reaction was heated at 70° C. for an additional 4 h. The reaction mixture was then allowed to cool to room temperature and added slowly to an Erlenmeyer flask charged with acetone (1.5 L), heated at 40° C., and vigorously stirred. The mixture was stirred for 2 h and the orange precipitate was collected by filtration. The orange solid was then washed with ethanol (1.0 L) and hot acetonitrile (0.5 L). After drying for 24 h under a vacuum line at room temperature, PPE polymer I. was obtained as an orange solid (10.2 g).

The number of repeating units "n" of this PPE is estimated by $^1$H NMR to be about 60. The polydispersity is about 1.4 to about 1.6 as determined by gel permeation chromatography using polystyrene standards. Melting point (mp) 130° C. (decomposition). $^1$H NMR (CDCl$_3$) δ7.55 (m, Ph, 2H/end group), 7.35 (m, Ph, 2H/end group), 7.02 (s, Ph, 2H/polymer), 6.85 (m, Ph, 4H/end group), 4.03 (t, J=6.25 Hz, OCH$_2$, 4H), 3.85 (s, OCH$_3$, 6H, end group), 1.88 (m, CH$_2$, 4H), 1.56 (m, CH$_2$, 4H), 1.27 (m, CH$_2$, 22H), 0.88 (t, J=6.32 Hz, CH$_3$, 6H).

Further polymers were synthesized using the above-cited reaction conditions and the synthesis scheme was demonstrated to be reproducible in generating polymers having length and polydispersity as cited herein. Polymers having structure I. where Ar$_1$ and Ar$_2$ are phenyl, x and y are 4, two para R's are H, and two para R's are OC$_{12}$H$_{25}$; or where two para R's are H, an R is OC$_{10}$H$_{21}$, and an R is triethyleneglycol; or where two para R's are H, an R is OC$_{10}$H$_{21}$, and an R is OCH$_2$CH$_2$COOCH$_2$CH$_3$ were synthesized, for example.

EXAMPLE 2

Solutions of Poly(aryleneethynylene) Processed Nanomaterials, and Solid Compositions Thereof Poly(aryleneethynylene) polymer having structure I., where Ar$_1$ and Ar$_2$ are phenyl, x and y are 4, two para R's are H and two para R's are OC$_{10}$H$_{21}$, and n is a number of repeating units, was prepared according to Example 1. The polymer was mixed with single-walled carbon nanotubes (SWNTs) and a solubilization solvent in the amounts as indicated in Table 1. The mixtures were sonicated at 25° C. for about 30 min to produce solutions of processed nanotubes. After sonication, each of the mixtures had formed a stable solution. The SWNTs used in the present example were purified HiPco-SWNTs ("SWNTs$_{HiPco}$") commercially available from Carbon Nanotechnologies, Inc. (Houston, Tex.), and purified SWNTs from Nanocyl (Namur, Belgium). While the concentrations of SWNTs$_{HiPco}$ in chlorobenzene shown in Table 1 are 2 mg/mL and 3 mg/mL, concentrations of processed nanotubes have been obtained to 10–15 mg/mL.

TABLE 1

Solutions of Processed Nanotubes

| No. | SWNTs$_{HiPco}$ (mg) | Structure I. Polymer (mg) | I.:SWNTs weight ratio | Solubilization Solvent (mL) | Conc. of SWNTs (mg/mL)* |
|---|---|---|---|---|---|
| 1. | 150 | 50 | 0.33 | chlorobenzene 50 | 3 |
| 2. | 500 | 250 | 0.5 | chlorobenzene 250 | 2 |

*based on SWNT material only (excludes polymer material)

Solutions of Table 1. are black in color, visually nonscattering, and no precipitation occurred upon prolonged standing (e.g., over 2 months). Solutions of Table 1. were stored at −5° C. to −20° C. and no precipitation was observed for months.

Solutions of Table 1. were each poured into a TEFLON® plate and dried to a solid film material at room temperature under vacuum for 180 min and 320 min, respectively. The removed solvent was trapped under liquid nitrogen and recycled for subsequent use. The solvent thus trapped is reusable without requiring purification. Although the solutions were dried at room temperature, the solutions could be heated up to about 40° C.–50° C. On a small scale, the solution can be dried by casting film with simple evaporation under atmospheric pressure.

The solid material is a black film having a uniform network of carbon nanotubes, a thickness between a few μm and 100's of μm, and electrical conductivity of about 10,000–50,000 Siemens/meter as measured using a standard four-point probe method.

EXAMPLE 3

Re-solubilization of Dried Film of Processed Nanotubes

The solid film formed in Example 2 was re-solubilized by mixing the film and a re-solubilization solvent ("RSS") as indicated in Table 2. The mixture was sonicated at room temperature for about 30 min. After sonication, each of the mixtures had formed a re-solubilized solution.

TABLE 2

Re-solubilization of Film of Processed Nanotubes

| No. | Amount of film in mg (Portion of film weight that is SWNTs) | Amount of re-solubilization solvent (mL) | Conc. of SWNTs in re-solubilized solution (mg/mL)* |
|---|---|---|---|
| 1. | 150 (100.05 mg, i.e., 66.7%) | Chloroform 75 | 1.33 |
| 2. | 60 (40 mg, i.e., 66.7%) | Dichloromethane 40 | 1 |

*based on SWNT material only (excludes polymer material)

No excess non-solubilized film was present in either sample. Solid film of processed nanotubes may also be solubilized in halogenated solvents such as 1,1,2,2-tetrachloroethane (typically at 1.5 mg/ml and up to about 3.0 mg/ml), chlorobenzene (typically at 0.5 mg/ml and up to about 1.5 mg/mL), and dichloroethane (typically at 0.5 mg/mL and up to about 1.0 mg/mL), for example.

Solid films of processed MWNTs were re-solubilized in chloroform, chlorobenzene, or dichloromethane at concentrations ranging from 2 mg/mL to 6 mg/mL; and in THF, toluene, or methyl ethyl ketone at concentrations ranging from 2 mg/mL to 5 mg/mL.

EXAMPLE 4

Composites Comprising Poly(aryleneethynylene) Processed Nanotubes

Composites comprising polystyrene and processed nanomaterial, polycarbonate and processed nanomaterial, epoxy and processed nanomaterial, polyurethane and processed nanomaterial were made using the processed nanomaterial as described herein.

Methods for incorporating processed nanomaterial as described herein into host polymer matrix include, but are not limited to: (i) in-situ polymerization of monomer(s) of the host polymer in a solvent system in the presence of processed nanomaterial; (ii) mixing both processed nanomaterial and host matrix in a solvent system; or (iii) mixing processed nanomaterial with a host polymer melt as set forth in U.S. patent application Ser. No. 10/850,721 filed May 21, 2004, the entire contents of which is incorporated herein by reference.

The polymer-processed nanotubes of the present embodiments allow high loading of nanotubes in composite material in the presence of low solvent volume due to the high concentration of processed nanotubes in the solvents (5 mg/mL–10 mg/mL).

Other embodiments of the present invention will be apparent to those skilled in the art from a consideration of this specification or practice of the embodiments disclosed herein. However, the foregoing specification is considered merely exemplary of the present invention with the true scope and spirit of the invention being indicated by the following claims.

The references cited herein, to the extent that they provide exemplary procedural or other details supplementary to those set forth herein, are specifically incorporated by reference.

As used herein and unless otherwise indicated, the terms "a" and "an" are taken to mean "one", "at least one" or "one or more".

What is claimed is:

1. A method of making a rigid poly(aryleneethynylene) polymer, the polymer having at least one functional group for solubilizing nanomaterial, a length of about 25 nm to about 110 nm, and a polydispersity of less than about 2, the method comprising:

coupling a para-diethynyl-($R_1$–$R_x$)arylene and an ($R_1$–$R_y$)-para-dihaloarylene in the presence of a first polymerization-terminating haloaryl agent, wherein each R of ($R_1$–$R_x$) and ($R_1$–$R_y$) is independently H, or a functional group for solubilizing nanomaterial, and at least one R of ($R_1$–$R_x$) and ($R_1$–$R_y$) is a functional group for solubilizing nanomaterial, and wherein x of ($R_1$–$R_x$) is the maximum number of substituents on the para-diethynyl-($R_1$–$R_x$)arylene, and y of ($R_1$–$R_y$) is the maximum number of substituents on the ($R_1$–$R_y$)-para-dihaloarylene, under conditions and for a period of time to produce fluorescence; and terminating the coupling by addition of a second polymerization-terminating haloaryl agent, the second haloaryl agent having equal or greater activity for coupling as the $(R_1-R_y)$-para-dihaloarylene.

2. The method of claim 1 wherein the arylene of the para-diethynyl-$(R_1-R_x)$arylene and the arylene of the $(R_1-R_y)$-para-dihaloarylene are the same arylene structure.

3. A method of making a rigid poly(ferrocenylarylene-ethynylene) polymer, the polymer having at least one functional group for solubilizing nanomaterial, a length of about 25 nm to about 110 nm, and a polydispersity of less than about 2, the method comprising:
coupling a 1,1'-diethynyl-$(R_1-R_8)$ferrocene and an $(R_1-R_z)$-para-dihaloarylene, or coupling a 1,1'-dihalo-$(R_1-R_8)$ferrocene and a para-diethynyl-$(R_1-R_z)$arylene, in the presence of a first polymerization-terminating haloaryl agent,
wherein each R of $(R_1-R_8)$ and $(R_1-R_z)$ is independently H, or a functional group for solubilizing nanomaterial, and at least one R of $(R_1-R_8)$ and $(R_1-R_z)$ is a functional group for solubilizing nanomaterial, and
wherein z of $(R_1-R_z)$ is the maximum number of substituents on the $(R_1-R_z)$-para-dihaloarylene,
under conditions for a period of time to produce fluorescence; and
terminating the coupling by addition of a second polymerization-terminating haloaryl agent, the second haloaryl agent having equal or greater activity for coupling as the $(R_1-R_z)$-para-dihaloarylene or the 1,1'-dihalo-$(R_1-R_8)$ferrocene.

4. A method of making a rigid poly(ferrocenylethynylene) polymer, the polymer having at least one functional group for solubilizing nanomaterial, a length of about 25 nm to about 110 nm, and a polydispersity of less than about 2, the method comprising:
coupling a 1,1'-diethynyl-$(R_1-R_8)$ferrocene and an $(R_1-R_8)$-1,1'-dihaloferrocene in the presence of a first polymerization-terminating haloaryl agent,
wherein each R of $(R_1-R_8)$ is independently H, or a functional group for solubilizing nanomaterial, and at least one R of $(R_1-R_8)$ is a functional group for solubilizing nanomaterial,
wherein corresponding R groups of the 1,1'-diethynyl-$(R_1-R_8)$ferrocene and the $(R_1-R_8)$-1,1'-dihaloferrocene are identical;
under conditions for a period of time to produce fluorescence; and
terminating the coupling by addition of a second polymerization-terminating haloaryl agent, the second haloaryl agent having equal or greater activity for coupling as the $(R_1-R_8)$-1,1'-dihaloferrocene.

5. The method of claim 1 wherein the coupling is carried out at a first temperature for a period of time followed by a second temperature for a period of time, wherein the second temperature is greater than the first temperature.

6. The method of claim 5 wherein the first temperature is about room temperature.

7. The method of claim 6 wherein the coupling at about room temperature is for about 10 mm to 1 hour.

8. The method of claim 5 wherein the second temperature is less than about 80° C.

9. The method of claim 8 wherein the coupling at 80° C. is for about 24 hours.

10. The method of claim 1 wherein the poly(aryleneethynylene) rigid polymer comprises a poly(phenyleneethynylene) polymer, the para-diethynyl-$(R_1-R_x)$arylene comprises a para-diethynyl-$(R_1-R_x)$benzene, and the $(R_1-R_y)$-para-dihaloarylene comprises a $(R_1-R_y)$-para-dihalobenzene.

11. The method of claim 1 wherein the first or second polymerization-terminating haloaryl agent comprises an iodoalkyloxybenzene or a bromoalkyloxybenzene, or a combination thereof.

12. The method of claim 1 wherein the iodoalkyloxybenzene comprises iodoanisole, iodoethoxybenzene, or iodopropoxybenzene, or a combination thereof.

13. The method of claim 1 wherein the bromoalkyloxybenzene comprises bromoanisole, bromoethoxybenzene, or bromopropoxybenzene, or a combination thereof.

14. The method of claim 1 wherein the polydispersity of the polymer is about 1.2 to about 1.8.

15. The method of claim 1 wherein the polydispersity of the polymer is about 1.4 to about 1.6.

16. The method of claim 1 wherein at least one R of $(R_1-R_x)$ or $(R_1-R_y)$ is alkoxy or alkyl.

17. The method of claim 10 wherein x is 4, y is 4, one set of para R's of $(R_1-R_x)$ is H and a corresponding set of para R's of $(R_1-R_y)$ is H.

18. The method of claim 10 wherein x is 4, y is 4, one set of para R's of $(R_1-R_x)$ is alkoxy and a corresponding set of para R's of $(R_1-R_y)$ is alkoxy.

19. The method of claim 10 wherein x is 4, y is 4, one set of para R's of $(R_1-R_x)$ is alkyl and a corresponding set of para R's of $(R_1-R_y)$ is alkyl.

20. The method of claim 10 wherein x is 4, y is 4, and each set of para R's of $(R_1-R_x)$ is identical to a corresponding set of para R's of $(R_1-R_y)$.

21. The method of claim 1 wherein the length of the polymer is about 25 nm to about 55 nm.

22. A rigid poly(aryleneethynylene) polymer made by the method of claim 1.

23. A rigid poly(ferrocenylaryleneethynylene) polymer made by the method of claim 3.

24. A rigid poly(ferrocenylethynylene) polymer made by the method of claim 4.

25. A rigid poly(phenyleneethynylene) polymer made by the method of claim 10.

* * * * *

UNITED STATES PATENT AND TRADEMARK OFFICE
CERTIFICATE OF CORRECTION

PATENT NO. : 7,296,576 B2  Page 1 of 1
APPLICATION NO. : 10/920877
DATED : November 20, 2007
INVENTOR(S) : Hassan Ait-Haddou and Marni Loriel Rutkofsky It is certified that error appears in the above-identified patent and that said Letters Patent is hereby corrected as shown below:

Column 2, line 67, "10 nm" should read as -- 110 nm --.

Column 15, line 64, "nd" should read as -- and --.

Signed and Sealed this

Twenty-ninth Day of April, 2008

JON W. DUDAS
*Director of the United States Patent and Trademark Office*